US012755203B2

(12) United States Patent
Esswie

(10) Patent No.: US 12,755,203 B2
(45) Date of Patent: Oct. 6, 2026

(54) ARTIFICIAL INTELLIGENCE MODEL TRAINING FOR IDLE MODE ASSISTANCE

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 733 days.

(21) Appl. No.: 18/303,362

(22) Filed: Apr. 19, 2023

(65) Prior Publication Data

US 2024/0378485 A1 Nov. 14, 2024

(51) Int. Cl.
*G06N 20/00* (2019.01)
*H04W 48/10* (2009.01)

(52) U.S. Cl.
CPC ............ *G06N 20/00* (2019.01); *H04W 48/10* (2013.01)

(58) Field of Classification Search
None
See application file for complete search history.

(56) References Cited

U.S. PATENT DOCUMENTS 11,864,145 B2 * 1/2024 Laselva ............. H04W 56/0095
12,256,316 B2 * 3/2025 Sha ....................... H04W 48/14
2009/0197588 A1 * 8/2009 Khandekar ......... H04W 72/541 455/63.1
2013/0163573 A1 6/2013 Oizumi et al.
2021/0160921 A1 * 5/2021 Kaya ................. H04W 74/0891
2021/0235407 A1 * 7/2021 Zhang ................. H04W 74/004
2022/0046490 A1 * 2/2022 Tripathi ............ H04W 36/0085
(Continued)

FOREIGN PATENT DOCUMENTS

EP 4 266 756 10/2023
WO 2021/219201 11/2021
WO 2022/126563 6/2022
(Continued)

OTHER PUBLICATIONS

Invitation to Pay Additional Fees mailed Feb. 19, 2024 for PCT Application No. PCT/US2023/036172, 14 pages.
(Continued)

*Primary Examiner* — Haimei Jiang
(74) *Attorney, Agent, or Firm* — Amin, Turocy & Watson, LLP

(57) ABSTRACT

A radio access network node, or nodes, may determine learning model configuration information to use to train a learning model corresponding to a user equipment in idle mode. A node may broadcast a training configuration resource indication in an information block indicative of a resource usable to broadcast a learning model training configuration or indicative of a resource usable to broadcast a training result. While idle, a user equipment may decode a training configuration according to the training configuration resource indication and perform a training action indicated in the training configuration. A learning model may be trained, based on the training action, while the user equipment is idle. While idle, the user equipment may use a model trained while the user equipment is idle to estimate a radio parameter and transmit the estimated radio parameter to a node to be used to establish a connection with the node.

20 Claims, 21 Drawing Sheets

(56) References Cited

U.S. PATENT DOCUMENTS

2022/0287104 A1* 9/2022 Jeon .................... G06N 20/00
2022/0377844 A1* 11/2022 Kumar ................. H04W 88/08

FOREIGN PATENT DOCUMENTS

WO 2022/229236 11/2022
WO 2023/018777 2/2023

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion mailed Apr. 9, 2024 for PCT Application No. PCT/US2023/036172, 21 pages.
International Search Report and Written Opinion mailed Mar. 18, 2024 for PCT Application No. PCT/US2023/036173, 13 pages.
Office Action mailed Jun. 18, 2025 for U.S. Appl. No. 18/303,375, 38 pages.
Esswie, Ali. "Artificial Intelligence Model Training for Idle Mode Assistance" U.S. Appl. No. 18/303,375, filed Apr. 19, 2023, 91 pages.
International Search Report and Written Opinion mailed Jun. 7, 2024 for PCT Application No. PCT/US2023/036172, 24 pages.
Office Action mailed Nov. 19, 2025 for U.S. Appl. No. 18/303,375, 25 pages.
Notification Concerning Transmittal of International Preliminary Report on Patentability mailed Oct. 30, 2025 for PCT Application No. PCT/US2023/036173, 8 pages.
European Office Action mailed Nov. 27, 2025 for European Patent Application No. 23813151.0, 3 pages.
Notification Concerning Transmittal of International Preliminary Report on Patentability mailed Oct. 30, 2025 for PCT Application No. PCT/US2023/036172, 16 pages.
European Office Action mailed Nov. 27, 2025 for European Patent Application No. 23813150.2, 3 pages.
Notice of Allowance mailed Mar. 30, 2026 for U.S. Appl. No. 18/303,375, 156 pages.

* cited by examiner

300

| | idle-mode AI/ML training configuration information block | | | |
|---|---|---|---|---|
| A | Feature ID 1 | Training RAN(s) | Training action(s) | Training resource(s) |
| B | Feature ID 2 | Training RAN(s) | Training action(s) | Training resource(s) |
| | : | | | |
| n | Feature ID n | Training RAN(s) | Training action(s) | Training resource(s) |
| | 502 | 504 | 506 | 508 |

500

FIG. 5A

| idle-mode AI/ML CSI training configuration information block | | | | |
|---|---|---|---|---|
| CSI feature ID | Target Cell ID: $x_1$ | Receive CSI-RS group ID $y_1$ | Timing and frequency resources | A |
| | Target Cell ID: $x_2$ | Receive CSI-RS group ID $y_2$ | Timing and frequency resources | B |
| | : | : | : | |
| | Target Cell ID: $x_n$ | Receive CSI-RS group ID $y_n$ | Timing and frequency resources | n |
| 522 | 524 | 526 | 528 | |

520

FIG. 5C

ARTIFICIAL INTELLIGENCE MODEL TRAINING FOR IDLE MODE ASSISTANCE

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise a method, comprising broadcasting, by a radio access network node comprising a processor, a learning model configuration information block message comprising a training configuration resource indication that is indicative of a training configuration resource usable to broadcast, by the radio access network node, a learning model training configuration and broadcasting, by the radio access network node, the learning model training configuration according to the training configuration resource. The learning model training configuration may comprise a training action indication indicative of a training action performable by an idle user equipment.

In an embodiment, the learning model training configuration may comprise a training action indication indicative of a training action, wherein the training action may correspond to a radio function learning model, or radio function learning model feature. Performing the training action may result in a determined radio function parameter value corresponding to the radio function learning model/feature. Examples of a training action may comprise transmitting, by the user equipment, a timing advance preamble, receiving a reference signal identifier usage to determine a best beam with respect to the user equipment, or transmitting a sounding reference signal group identifier. The learning model configuration information block message may further comprise a training result resource indication that is indicative of a training result resource usable to transmit the determined radio function parameter value. The example method may further comprise transmitting, by the radio access network node to the idle user equipment, the determined radio function parameter value according to the training result resource.

The training action may correspond to a radio function learning model, wherein performing the training action is to result in a determined radio function parameter value corresponding to the radio function learning model. The example method may further comprise receiving, by the radio access network node from the idle user equipment, a radio resource control signal message comprising the determined radio function parameter value. The example method may further comprise establishing, by the radio access network node using the determined radio function parameter value received from the idle user equipment in the radio resource control signal message, a connection with the idle user equipment, as a result of which the idle user equipment becomes a connected user equipment. In an embodiment, the determined radio function parameter value may comprise a timing advance value corresponding to a timing advance corresponding to the radio access network node with respect to the idle user equipment. In an embodiment, the determined radio function parameter value may comprise a best serving beam indication corresponding to a beam associated with the radio access network node having a higher signal strength, with respect to the user equipment, than other signal strengths associated with other beams, other than the beam, corresponding to the radio access network node.

In an embodiment, the learning model training configuration may comprise a training resource indication that is indicative to the idle user equipment of a training resource usable to perform, by the idle user equipment, the training action. In an embodiment, the radio access network node may be a first radio access network node, and the example method further comprise receiving, by the first radio access network node from a second radio access network node that is a neighboring radio access network node with respect to the first radio access network node, a non-training resource indication that is indicative to the first radio access network node of a non-training resource to be reserved by the second radio access network node and usable by the second radio access network node to conduct non-training operations. The example method may further comprise scheduling, by the first radio access network node, the training resource to avoid overlap of the training resource corresponding to the first radio access network node with the non-training resource corresponding to the second radio access network node.

In an embodiment of the example method the radio access network node may be a first radio access network node, and the learning model training configuration may comprise a training action indication indicative of a training action to be performed by at least one idle user equipment with respect to the first radio access network node to result in a first determined learning model parameter value. The example method may further comprise receiving, by the first radio access network node from the at least one idle user equipment, the first determined learning model parameter value. The example method may further comprise receiving, by the first radio access network node from a second radio access network node that is a neighboring radio access network node with respect to the first radio access network node, a second determined learning model parameter value, wherein the training action was performed by at least one of the at least one idle user equipment with respect to the second radio access network node to result in the second determined learning model parameter value. The example method may further comprise determining, by the first radio access network node, a composite determined learning model parameter value based on the first determined learning model parameter value and based on the second determined learning model parameter value and broadcasting, by the first radio access network node to the at least one idle user equipment via a composite result information block message, the composite determined learning model parameter value. The composite determined learning model parameter value may be based on information transmitted by the user equipment to the first radio access network node and transmitted by the user equipment or by another user equipment to the second radio access network node. The composite determined learning model parameter value may be based on information transmitted by the user equipment or by another user equipment to the first radio access network node and transmitted by another user equipment to the second radio access network node.

In an embodiment, the training action may correspond to a radio function learning model and the composite determined learning model parameter value may be usable by the at least one idle user equipment to train the radio function learning model to result in a trained learning model at the at least one idle user equipment. The example method may further comprise receiving, by the first radio access network node from the at least one idle user equipment, a connection request message, comprising a performance indicator estimated by the at the at least one idle user equipment using the trained learning model to result in an estimated performance indicator. Based on the estimated performance indicator, the method may further comprise establishing a connection with the idle user equipment, as a result of which the idle user equipment becomes a connected user equipment with respect to the first radio access network node.

In an embodiment, the learning model configuration information block message may be a system information block message. In another embodiment, the learning model configuration information block message may be a master information block message. Accordingly, an idle mode user equipment may obtain the configuration resource of the result resource information from an information block that the user equipment is configured to decode while idle.

In another example embodiment, a first radio access network node may comprise a processor configured to receive, from a second radio access network node that is a neighboring radio access network node with respect to the first radio access network node, a non-training resource indication that is indicative to the first radio access network node of a non-training resource to be used by the second radio access network node to conduct a non-training operation, and schedule a training resource, to be used by at least one idle mode user equipment to perform a training action with respect to the first radio access network node, as a result of which the training resource and the non-training resource are non-overlapping. The processor may be further configured to broadcast a master information block message comprising a training configuration resource indication that is indicative of a training configuration resource to be used to broadcast, by the first radio access network node, a learning model training configuration. The processor may be further configured to broadcast the learning model training configuration according to the training configuration resource.

The learning model training configuration may comprise a training resource indication that is indicative to the at least one idle mode user equipment of the training resource to be used to perform the training action by the at least one idle mode user equipment. The master information block message may further comprise a training result resource indication that is indicative of a training result resource to be used by the at least one idle mode user equipment to receive, from the first radio access network node, a training result that results from performing, by the at least one idle mode user equipment, the training action.

In an embodiment, the processor may be further configured to determine a training result that results from performing, by the at least one idle mode user equipment, the training action; and based on the training result, establishing a connection with the at least one idle mode user equipment, as a result of which the at least one idle mode user equipment becomes an at least one connected mode user equipment.

In another example embodiment, a non-transitory machine-readable medium may comprise executable instructions that, when executed by a processor of a first radio access network node, facilitate performance of operations, comprising broadcasting a first information block message comprising a training configuration resource indication that is indicative of a training configuration resource. The operations may further comprise broadcasting a learning model training configuration according to the training configuration resource, wherein the learning model training configuration comprises a training action indication indicative of a training action to be performed by a first of at least one idle user equipment with respect to the first radio access network node to result in a first determined learning model parameter value. The operations may further comprise receiving, from the first of the at least one idle user equipment, the first determined learning model parameter value, and receiving, from a second radio access network node that is a neighboring radio access network node with respect to the first radio access network node, a second determined learning model parameter value, wherein the training action was performed by at least a second of the at least one idle user equipment with respect to the second radio access network node to result in the second determined learning model parameter value. The operations may further comprise determining, based on the first determined learning model parameter value and based on the second determined learning model parameter value, an updated learning model and broadcasting, to the first of the at least one idle user equipment via a second information block message, the updated learning model. In an embodiment, the training action may have been performed by the first of the at least one idle user equipment with respect to the second radio access network node to result in the second determined learning model parameter value. In an embodiment, the operations may further comprise transmitting, to the second radio access network node via a backhaul link, the updated learning model.

In another example embodiment, a method may comprise receiving, from a first radio access network node by a user equipment comprising a processor, a learning model configuration information block message comprising a training configuration resource indication indicative of a training configuration resource usable to broadcast, by the first radio access network node, a learning model training configuration. The method may further comprise receiving, by the user equipment, the learning model training configuration according to the training configuration resource. The method may further comprise decoding, by the user equipment, the learning model training configuration. The decoding of the learning model training configuration comprises blind decoding. The learning model training configuration may comprise a training action indication indicative of a training action to be performed by the user equipment.

In an embodiment, the learning model training configuration may comprise at least one timing advance preamble corresponding to a second radio access network node that is a neighboring radio access network node with respect to the first radio access network node and the training action may comprise transmitting, to the second radio access network node, one of the at least one timing advance preamble. The method may further comprise transmitting, by the user equipment to the second radio access network node, the one of the at least one timing advance preamble corresponding to the second radio access network node, wherein the one of the at least one timing advance preamble corresponding to the second radio access network node may be usable by the second radio access network node to result in an at least one updated timing advance learning model parameter corresponding to a timing advance learning model.

The learning model configuration information block message may comprise a training result resource indication indicative of a training result resource usable to receive, by the user equipment, the at least one updated timing advance learning model parameter. The method may further comprise receiving, by the user equipment via the training result resource, the at least one updated timing advance learning model parameter. Based on the at least one updated timing advance learning model parameter, the method may further comprise updating, by the user equipment, the timing advance learning model to result in an updated timing advance learning model.

In an embodiment, based on the updated timing advance learning model, the method may further comprise determining, by the user equipment, a timing advance corresponding to the first radio access network node with respect to the user equipment. The method may further comprise transmitting, by the user equipment to the first radio access network node, a connection establishment request message comprising the timing advance, and, based on the connection establishment request message, establishing, by the user equipment with the first radio access network node, a communication connection, as a result of which the user equipment is in a connected mode, or becomes connected, with respect to the first radio access network node.

In an embodiment, based on the updated timing advance learning model, the method may further comprise determining, by the user equipment, a timing advance corresponding to the second radio access network node with respect to the user equipment. The method may further comprise transmitting, by the user equipment to the second radio access network node, a connection establishment request message comprising the timing advance. Based on the connection establishment request message, the method may further comprise establishing, by the user equipment with the second radio access network node, a communication connection, as a result of which the user equipment is in connected mode with respect to the second radio access network node.

In an example embodiment, a user equipment may comprise a processor configured to receive, from a radio access network node, a learning model configuration information block message, wherein the learning model configuration information block message may comprise a training configuration resource indication indicative of a training configuration resource usable to receive, from the radio access network node, a learning model training configuration. The processor may be further configured to receive the learning model training configuration according to the training configuration resource and decode the learning model training configuration, wherein the learning model training configuration comprises a training action indication indicative of a training action to be performed by the user equipment. The processor may be further configured to perform the training action to result in a training action result and to transmit, to the radio access network node, the training action result. In an embodiment, the training action comprises generating a sounding reference signal to result in the training action result being a generated sounding reference signal and wherein the generated sounding reference signal is transmitted to the radio access network node, the generated sounding reference signal being usable by the radio access network node to train an uplink resource grant learning model to result in a trained uplink resource grant learning model.

In an embodiment, the processor may be further configured to establish a communication connection with the radio access network node, wherein the communication connection comprises at least one uplink resource being granted, based on the trained uplink resource grant learning model, by the radio access network node. The granting of the at least one uplink resource by the radio access network node may be based on excluding, by the user equipment, of transmission of a sounding reference signal after the transmitting, by the user equipment, of the generated sounding reference signal. Put another way, the at least one uplink resource may be granted by the radio access network node based on a prospectively transmitted sounding reference signal that was transmitted by the user equipment while the user equipment was idle.

In an embodiment, the radio access network node may be a first radio access network node, the user equipment may perform the training action with respect to the first radio access network node to result in the training action result being a first training action result, and the user equipment may transmit, to the first radio access network node, the first training action result. The processor may be further configured to perform, with respect to a second radio access network node that is a neighboring radio access network node with respect to the first radio access network node, the training action to result in the second training action result. The process may be further configured to transmit, to the second radio access network node, the second training action result.

In yet another example embodiment, a non-transitory machine-readable medium may comprise executable instructions that, when executed by a processor of a user equipment, facilitate performance of operations, comprising receiving, while the user equipment is idle, from a first radio access network node, a learning model configuration information block message comprising a training result resource, or comprising an indication of a training result resource, usable by the user equipment to receive a training result from the first radio access network node and receiving, while the user equipment is idle, from a first radio access network node, a learning model training configuration comprising a training action indication indicative of a training action performable by the user equipment with respect to at least the first radio access network node. The operations may further comprise performing, while the user equipment is idle, the training action with respect to the first radio access network node to result in a first training action result.

In an embodiment, the operations may further comprise receiving, from the first radio access network node, the first training action result. The first training action result may be received according to the training result resource indicated in the learning model configuration information block message.

In an embodiment, the operations may further comprise performing, while the user equipment is idle, the training action with respect to a second radio access network node to result in a second training action result, wherein the second radio access network node is a neighboring radio access network node with respect to the first radio access network node, and receiving, from the second radio access network node, the second training action result.

In an embodiment, the first training action result may be used by the first radio access network node to update a learning model.

In an embodiment, the first training action result may be used by the user equipment to update a learning model to result in an updated learning model to be used by the user equipment. The learning model is a beam selection learning model and wherein the updated learning model is an updated beam selection learning model.

In an embodiment, the operations may further comprise determining, while the user equipment is idle, with the updated beam selection learning model, a determined preferred serving beam corresponding to the first radio access network node to be used during a connection establishment corresponding to the first radio access network node. The operations may further comprise transmitting, while the user equipment is idle, to the first radio access network node, a connection establishment message comprising a preferred serving beam indication that is indicative to the first radio access network node of the determined preferred serving beam to be used to establish a connection with the first radio access network node. The operations may further comprise establishing the connection with the first radio access network node, wherein the connection comprises the determined preferred serving beam, and wherein the establishing of the connection with the first radio access network node excludes beam sweeping to determine a best beam corresponding to the user equipment.

In an embodiment, the learning model may comprise a timing advance learning model. The updated learning model may comprise an updated timing advance learning model.

BRIEF DESCRIPTION OF THE DRAWINGS

FIG. 5A illustrates an example learning model training configuration to be used to train a learning model at an IDLE mode user equipment.

FIG. 5C illustrates an example learning model training configuration to be used to train a channel state information learning model at an IDLE mode user equipment.

DETAILED DESCRIPTION OF THE DRAWINGS

Figure 1:
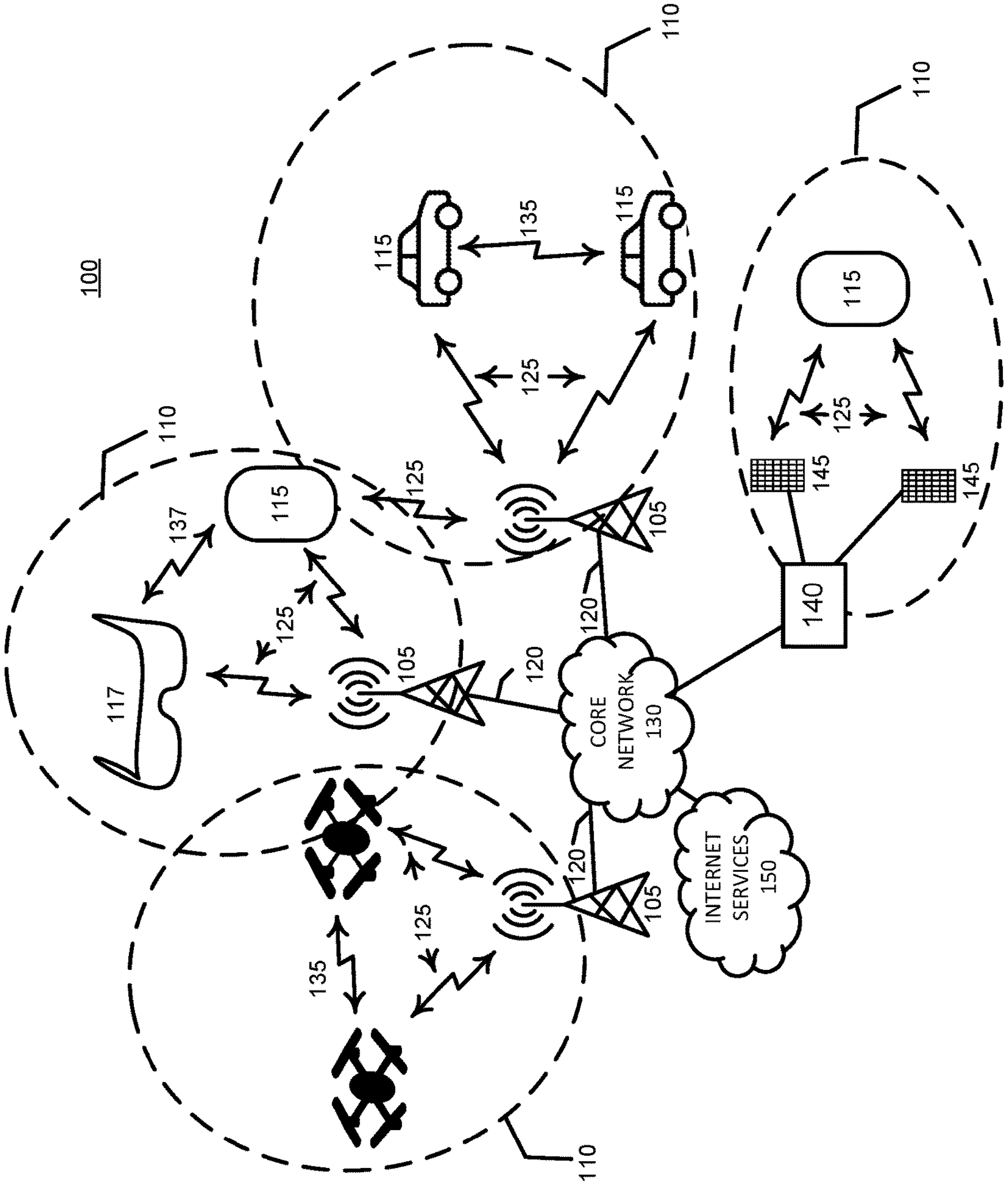
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

A network RAN can dynamically control activation, deactivation, triggering of model retraining (that may be radio-function-specific) or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE. A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2. Xn, or other interface) either directly (e.g., directly between base stations 105), or indirectly (e.g., via core network 130), or both. In some examples, backhaul links 120 may comprise one of more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs. or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE. LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Conventional rules-based models may be implemented in user equipment to perform various radio frequency ("RF") functions or signal processing functions, such as, beamforming, channel estimation, demodulation, and decoding, and may be based on well-established system models. Such models may result in satisfactory performance as long as the models closely follow actual behavior of a radio network system in which the user equipment is/are operating. However, performance of conventional models may provide less than optimal performance. AI/ML-based models typically outperform their conventional counterparts; unlike conventional rules-based models, AI/ML-based models may be based on data rather than rules of a pre-determined conventional model. Thus, outputs, or outcomes, of conventional rules-based models may be deemed 'deterministic' because inputs are applied to static rules that result in a 'determined' output whereas outputs, or outcomes, of an AI/ML model may be viewed as probabilistic because, a learning model typically infers a probable output based on coefficients, factors, functions, or other variables that may have been arrived at based on previous inputs to the model.

Use of an AI/ML model may facilitate improved user equipment performance compared to use of a conventional rules-based model. Multiple AI/ML driven use cases may include AI/ML timing advance acquisition/prediction, AI/ML channel state information ("CSI") acquisition/prediction, AI/ML radio positioning, and AI/ML beam management. Although an AI/ML-based model trained using data from actual, real-world operation, can potentially outperform a traditional rules-based model, a learning model may be less robust, and thus provide less desirable results, in situations where the radio system/environment may have undergone changes that may not have been experienced, or 'seen', during training of the learning model, and thus the learning model may infer less-than-undesirable outputs than a static rules-based model in such an situation that is 'unknown' to the learning model. This problematic situation may be caused by, for example, specific network/user equipment conditions or configurations, or by an architecture of an AI/ML learning model, or a combination thereof. Therefore, it is desirable to implement procedures such that a network RAN can update an AI/ML learning model.

For an AI/ML learning model implementation of a radio function at a user equipment, the user equipment or gNB/RAN may predict modulation and coding schemes ("MCS"), and a given amount of channel state information reporting instants may be used therefor. A modulation and coding scheme may be referred to as a format. A format, or scheme, may be associated with a Quality-of-service. A channel condition or an interference condition that did not exist during training or a model may systematically result in a less-than-optimum MCS selection, which accordingly may lead to violating minimum device performance targets.

Figure 2:
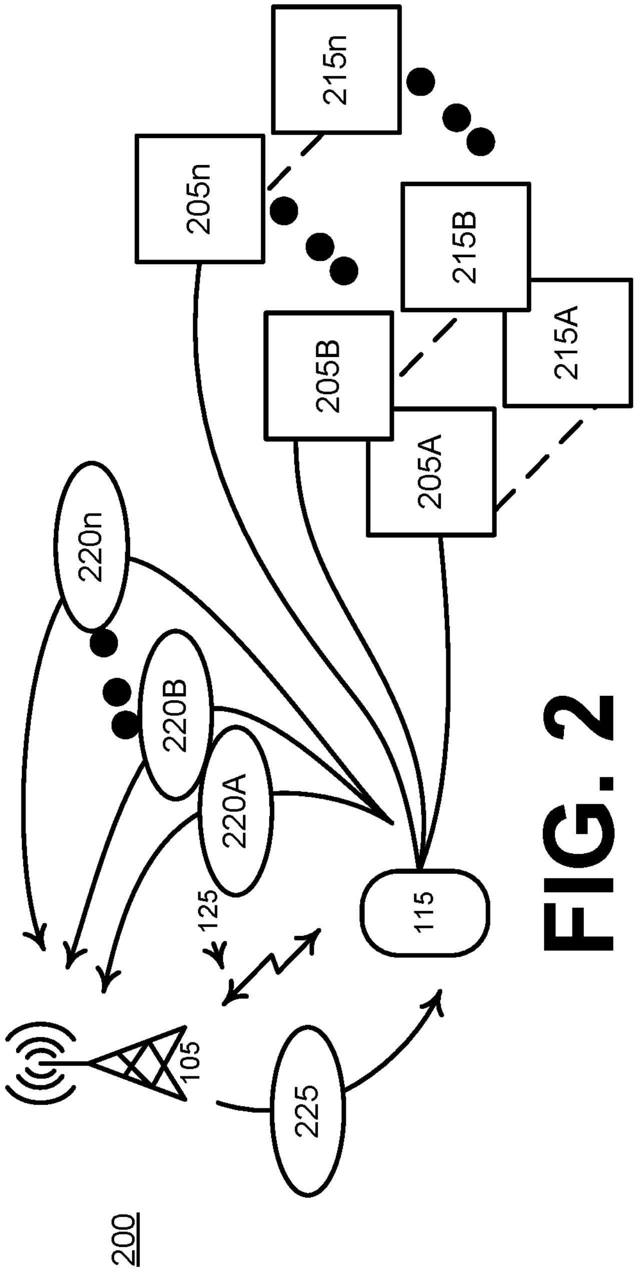
FIG. 2 illustrates an example environment with radio functions implemented in conjunction with corresponding learning models.

Turning now to FIG. 2, the figure illustrates a system 200 comprising a RAN node 105 in communication with a user equipment 115 via wireless link 125. UE 115 may perform various radio functions 205A-205*n* that may be facilitated by corresponding machine learning models 215A-215*n*, respectively. During UE 115 wireless operation and communication with RAN 105, the UE may transmit parameter metric reports 220A-220*n* that may comprise one or more learning model parameter metrics, corresponding to 215A-215*n*, respectively. Reports 220A-220*n* may comprise one or more control action requests, for example, requesting that one or more of models 215A-215*n* be deactivated, or retrained. RAN 105 may transmit to UE 115 a radio resource control message 225 corresponding to learning model information 215.

AI/ML learning models, such as models 215 shown in FIG. 2 deployed at UE device 115 may be implementation-specific, (e.g., vendor proprietary learning models). (Examples of vendors that may provide proprietary learning models may comprise user equipment manufacturers or providers of applications for user equipment, network equipment providers or providers of applications for network equipment, or mobile network operators or providers of applications for mobile network operators.) The network RAN may determine overall performance of learning models deployed at a UE to facilitate minimum device performance requirements. A dynamic reporting procedure may facilitate user equipment devices compiling and reporting indications, which may be configured, or preconfigured, that reflect, or indicate, model performance of corresponding learning models.

A particular user equipment device may adopt several different AI/ML learning model implementations for running, performing, or otherwise facilitating different radio functions. Different learning model parameter metrics may be indicative of performance of different learning models. A user equipment may compile and report one or more different learning model performance-indicating parameter metrics, or indications, per each learning model. Different learning model metrics may be associated with different respective filtering or time resolution configurations. Thus, such customized metric reporting for a given learning model may facilitate optimized tracking and reporting for each active learning model of each user equipment device 115 that may be served by a RAN 105, as shown in FIG. 1 or FIG. 2. Accordingly, a network RAN 105 can obtain and use real-time performance of each learning model active at a UE 115 to facilitate optimum performance of the learning model and inferences it may generate. Furthermore, several reporting variants may be tailored to suit various AI/ML learning model implementations or purposes, for example, exact absolute, exact relative, quantized, or temporal (e.g., historical) metric reporting. Network node RAN 105 may dynamically trade AI/ML learning model reporting overhead for accuracy in obtaining AI/ML model performance metrics.

For AI/ML learning model performance, various parameters, and metrics corresponding thereto, may be considered, analyzed, or evaluated depending on the nature of the problem being solved and corresponding learning model functionality (for example, regression or classification), or radio function being performed or facilitated by a learning model. For example, for a radio function such as channel estimation or channel state information ("CSI") compression, a regression function may be used in a learning model with the following parameters, or metrics corresponding thereto, potentially being evaluated: Mean squared error ("MSE"); Root mean squared error ("RMSE"); Normalized mean squared error ("NMSE"); Mean absolute error ("MAE"); R-squared; Generalized cosine similarity ("GCS"); or Squared generalized cosine similarity ("SGCS"). Table 1 shows example functions defining corresponding learning model parameters, metrics corresponding to which may be monitored and evaluated as listed above.

TABLE 1

| Learning Model Parameter | Definition |
|---|---|
| Mean squared error | $\frac{1}{N}\sum_{i=1}^{N}(y_i - \hat{y}_i)^2$ |
| Root mean squared error | $\sqrt{\frac{1}{N}\sum_{i=1}^{N}(y_i - \hat{y}_i)^2}$ |
| Normalized mean squared error | $\frac{1}{N}\sum_{i=1}^{N}\frac{(y_i - \hat{y}_i)^2}{y_i^2}$ |
| Mean absolute error | $\frac{1}{N}\sum_{i=1}^{N}\lvert y_i - \hat{y}_i\rvert$ |
| R-squared | $1 - \frac{\sum_{i=1}^{N}(y_i - \hat{y}_i)^2}{\sum_{i=1}^{N}(y_i - \overline{y})^2}$ |
| Generalized cosine similarity | $\frac{1}{N}\sum_{i=1}^{N}\frac{\lvert y_i^H \hat{y}_i\rvert}{\lVert y_i\rVert\lVert\hat{y}_i\rVert}$ |
| Squared generalized cosine similarity | $\frac{1}{N}\sum_{i=1}^{N}\frac{\lvert y_i^H \hat{y}_i\rvert^2}{\lVert y_i\rVert^2\lVert\hat{y}_i\rVert^2}$ |

For a classification problem such as beam index prediction, an accuracy parameter metric can be analyzed to determine performance of a learning model that is facilitating beam index predictions. Other example learning model parameter metrics that may indicate performance of learning models resolving a classification problem, may include, but are not limited to, absolute numbers of true negatives, true positives, false negatives, and false positives; Precision and recall; or an F1 score. An F1-score may comprise an evaluation metric, which is used to express the performance of a machine learning model, or classifier and provides combined information about the precision and recall of the learning model. A high F1-score metric typically indicates a high value for both recall and precision metrics.

AI/ML learning model implementations at different devices may be vendor-proprietary as described above, and may be transparent to network nodes (e.g., a RAN serving a UE may not have access to specific functions and programming of a given learning model deployed in the UE that facilitates radio functions). To manage and facilitate a UE device in achieving performance targets, the RAN node may be made aware of the UE device's capability and an overall AI/ML learning model performance. Therefore, active UE devices, upon first connecting to a serving network RAN, may transmit device-specific AI/ML capability information including the following information elements ("IE"s): Type of AI/ML supported algorithms including supervised learning, unsupervised learning, and reinforcement learning; List of AI/ML supported radio functions; List of supported AI/ML model-specific metrics to estimate and report; Model bank size of each radio function, e.g., number of models that can be stored for each radio function; or Indication of model categorization (small/medium/large), which may facilitate the network RAN in defining, or determining, a dataset to be used by a learning model. For example, for a large number of neurons (e.g., nodes of a learning model neural network), determination of a commensurate number of information samples may be used to avoid overfitting by the learning model. AI/ML capability information elements can be part of device capability signaling based on the subsequent radio resource control ("RRC") signaling or based on a dynamically scheduled uplink control information ("UCI") transmission. Accordingly, a network RAN may determine updates to one or more learning models and may deliver the updated models, or coefficients corresponding thereto, to user equipment.

Existing techniques refine, update, and deliver AI/ML models, model information, and model parameter values only for connected mode devices, (e.g., user equipment devices that have a communication connection established with a serving radio access network node). Using conventional techniques, channel conditions, control channels, data channels, reference signals, AI/ML capabilities, and supported AI/ML radio features corresponding to a connected mode user equipment are identified and established. However, conventional techniques do not facilitate AI/ML training and assistance support for idle mode user equipment devices. An idle mode user equipment device is not 'known' to a radio access network node because the user equipment is not connected to the node. Thus, a user equipment's AI/ML capabilities, supported AI/ML driven features, and locations are not known to the network.

AI/ML model training facilitates efficient deployment of AI/ML algorithms within cellular wireless communication networks. Trained AI/ML models can offer predictive output based on actual data that provide results sufficient to support satisfactory performance. Without training. AI/ML models being used at user equipment devices or at RAN nodes may output wrong, or inaccurate, results that may cause inappropriate actions or prediction estimates. A model trained with a large and diverse training sample set may result in an AI/ML model that recognizes a variety of radio conditions and can responsively refine the model's output based on the detected radio conditions. However, AI/ML model training is a time consuming, signaling-overhead-intensive, and processing-heavy operation that is typically tuned to the needs of a particular user equipment, the user equipment's AI/ML model capability, or a radio function corresponding to a model being trained. For connected mode user equipment devices, for which channel conditions, data channels, control channels, serving radio access network node, or AI/ML capability are 'known' and established at the network, AI/ML model training can be sufficiently tuned to the needs and radio conditions of each connected mode device. For a connected mode user equipment, AI/ML model training information can be transferred or delivered via a device-specific or device-common established control channel or data channels. Training of AI/ML learning models with respect to a user equipment in a connected mode may be accomplished using conventional techniques by transferring, or downloading, model information to the connected user equipment for execution using real-time data. Thus, for connected mode devices, transfer of learning model information can occur via control change exchange or via data channel delivery because, for connected mode devices, data and control channels are already identified, adapted to device channel conditions, and otherwise established.

However, during typical use condition user equipment device is in an idle state (e.g., a UE does not have an established connection with a radio access network node) a large percentage of the time the device is powered on. While idle, neither a data channel, a control channel, nor a serving RAN is established or even known. Thus, AI/ML model training using conventional techniques for idle mode user equipment is not performed.

Excluding AI/ML model training support for idle mode devices significantly restricts or limits the true potential of the AI/ML deployments, since the majority of cellular user equipment devices are in an idle state for most of the time that the user equipment is powered on. Furthermore, having AI/ML models trained using current radio condition information as one or more inputs to a learning model during an extended idle mode period, during which radio conditions may be changing (e.g., a user equipment is moving, or is being mode, while idle) may facilitate faster and more reliable transition to active connected state when a device attempts to establish a network session that if the user equipment uses an AI/ML model that is not trained based on current conditions. For example, a user equipment having a well-trained AI/ML model (e.g., a model trained using current radio condition information) driving a downlink beam prediction function during idle mode time may, using a learning mode trained based on recent radio conditions, proactively, or prospectively, determine, and identify to a radio access network node a predicted refined downlink beam, which the user equipment device expects to result in sufficient coverage, when the user equipment transitions to a connected mode with the radio access network node. Thus, by using a beam selection learning model to prospectively train a learning model (e.g., the model is trained while the UE is idle) to determine, predict, or estimate a best beam, upon the user equipment device connecting to the radio access network node, the node may avoid, or exclude, transmitting reference signals to be used to refine a downlink beam determination corresponding to the device, thus potentially reducing access delay and signaling overhead.

Embodiments disclosed herein facilitate AI/ML model assistance and training for multiple radio functions for idle mode user equipment devices. Examples include AI/ML assisted timing advance ("TA") acquisition, AI/ML assisted downlink reference signal and beam estimation, or AI/ML assisted uplink reference signal estimation. Embodiments disclosed herein facilitate training AI/ML models that implement various radio functions while a user equipment is in: an idle mode, an idle state, an inactive mode, or an inactive state, which may be collectively referred to herein as 'idle' or 'idle mode'. Training an AI/ML model while a user equipment is idle may facilitate a reduction in time to transition to a connected mode, and may facilitate a transition from idle to being connected more reliable and more efficient than if the AI/ML is not trained until after a user equipment is connected to a serving radio access network node. For example, when an idle mode device is sufficiently trained for TA acquisition and beam estimation while idle, the user equipment can proactively, or prospectively, efficiently make an TA estimation (while the user equipment is in idle mode) and predict/estimate one or more radio function parameter values and transmit the one or more parameter values to a RAN node to which the user equipment is attempting to connect, (e.g., to establish a data/call session). Thus, the RAN node to which the UE is attempting to connect may avoid performing procedures to determine or obtain radio parameter values since the parameter values may be proactively/prospectively offered by the UE using a trained AI/ML model (trained while the UE is in idle mode), or prospectively obtained by the RAN node, thus making the transition to connected mode and establishing data/call sessions faster and more efficient than if such parameter values are determined after the UE has begun connection establishment.

Embodiments disclosed herein may implement inter-cell/inter-RAN coordination procedures, via backhaul links, to exchange coordinated AI/ML assistance training data, parameter values, updated models, samples, or other model information to be provided to idle mode user equipment devices. Embodiments described herein may implement multiple signaling procedures of delivering the AI/ML assisted idle mode configurations and results feedback for both idle mode devices and coordinating RAN nodes to achieve a desired AI/ML model training accuracy corresponding to a radio function. In an embodiment, a new radio application programming interface ("API") may facilitate AI/ML capable devices reporting back AI/ML model-predicted radio key performance indicators ("KPI") when transitioning from idle to connected mode, based on estimated parameter values, or values derived therefrom, generated by an AI/ML model trained while the UE is in idle mode. Accordingly, not only may an AI/ML model at a user equipment be trained while the user equipment is in an idle mode; an idle mode user equipment device can use AI/ML training instants of various radio functions to provide proactive/prospective predictive intelligence when attempting to connect to a radio access network node (e.g., while transitioning to connected mode).

Dynamic AI/ML training assistance for idle mode devices.

Figure 3:
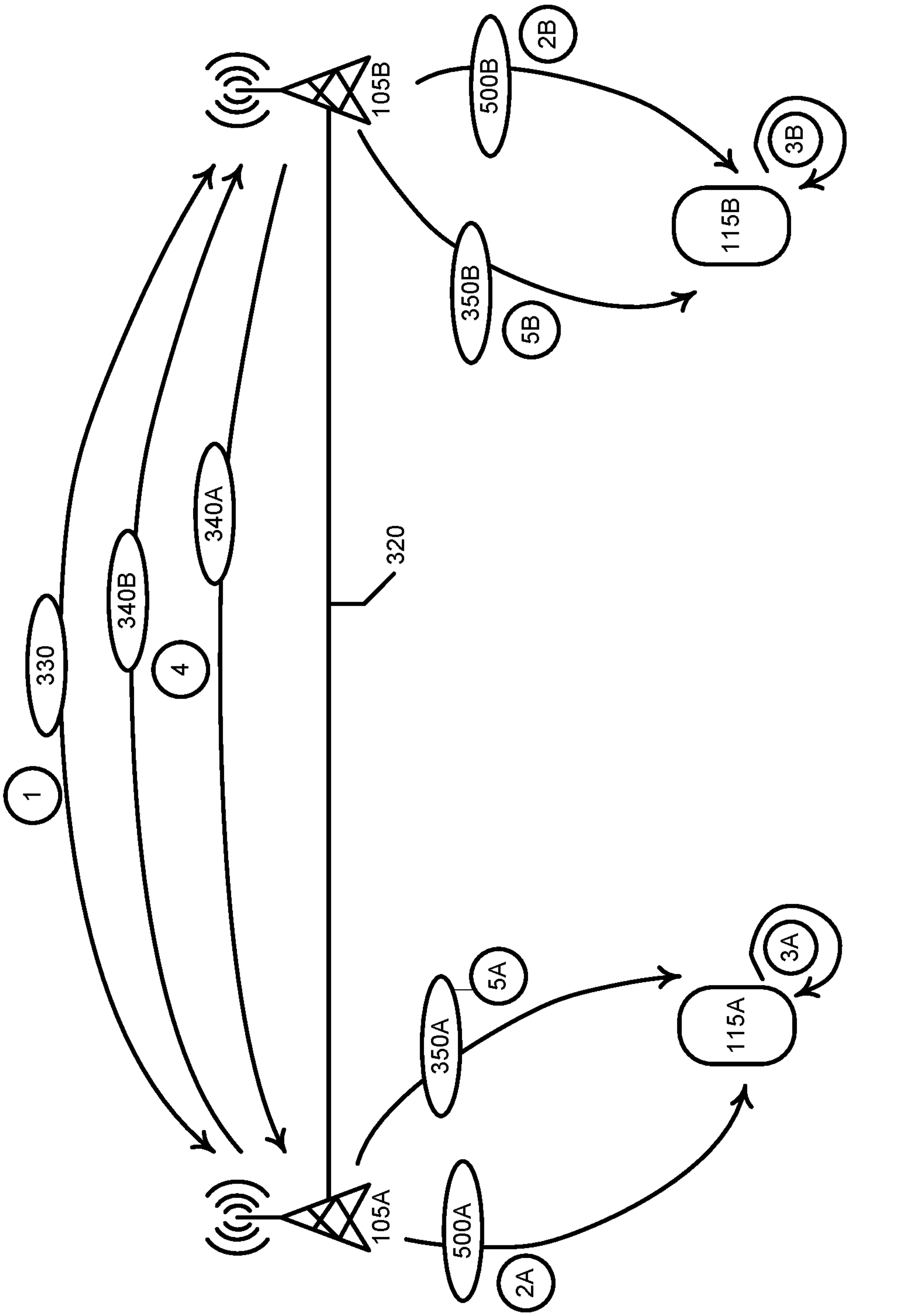
FIG. 3 illustrates an example environment with artificial intelligence machine learning model information being exchanged between radio access network node and being used to update artificial intelligence machine learning models at IDLE mode user equipment.

Turning now to FIG. 3, actions illustrated in environment 300 facilitate idle mode AI/ML training assistance. At act 1, RAN nodes of a coordination group of RAN nodes, which may comprise adjacent RAN nodes/cells 105A and 105B, may coordinate, via backhaul links 320, regarding idle mode AI/ML training assistance, including coordination regarding support for radio function AI/ML training while a user equipment is in an idle mode. RAN nodes 105A and 105B may coordinate expected actions by user equipment devices UE 115A or 115B and actions of the coordinating RAN nodes (e.g., the RAN nodes may coordinate transmitting of reference signals or transmitting preambles or reference signals by user equipment), and associated per RAN node AI/ML training resources (e.g., RAN nodes coordinate to avoid overlap of scheduling of resources for training purposes with scheduling of resources of non-AI idle mode operations such as paging). At act 2A or 2B, coordinating RAN nodes 105A or 105B may respectively deliver, for example via broadcast signaling, AI/ML configuration information block signal messages 500A or 500B that may be detected by idle mode user equipment devices 115A or 115B within coverage of the coordinating RAN nodes. Message 500A or 500B may comprise, or be indicative of, configuration information corresponding to currently available AI/ML learning model idle mode training assistance and supported idle mode radio functions (e.g., learning models that facilitate radio functions that may be trained while a UE is in idle mode).

At act 3A or 3B, AI/ML capable idle mode user equipment devices 115A or 115B may perform AI/ML training actions indicated in, or by, configuration message 500A or 500B (e.g., measuring AI/ML training reference signals transmitted from RAN 105A or RAN 105B, transmitting uplink preambles and/or reference signals to RAN 105A or RAN 105B, etc.) for radio functions which may supported or that may be of interest (e.g., of interest to a RAN or to a UE). At act 4, in case of all of, or a subset of, idle mode trained AI/ML models requiring that training results be fed back to user equipment devices, coordinating RAN nodes 105A and 105B may exchange AI/ML training results 340A or 340B, for example via backhaul interface links 320 (e.g., results exchanged at act 4 may comprise, for example, received uplink coverage from reference signals transmitted by UE devices, estimated timing advance received from UE devices, etc.) to facilitate at one RAN a learning model corresponding to a radio function being harmonized with the same learning model at the other RAN. RAN node 105A or 105B may transmit at act 5A or act 5B an AI/ML training assistance result information block, as a broadcast signal message 350A or 350B, respectively, containing result(s) of inter-cell AI/ML training collected from adjacent cells/RAN nodes of the same AI/ML coordination group, which may comprise 105A or 105B.

In an embodiment, upon establishing a connection to RAN 105A or 105B, a new radio signaling API may facilitate user equipment devices 115A or 115B indicating to a RAN node 105A or 105B proactive/prospectively determined radio access key performance indicators ("KPI"), which may be estimated based on AI/ML models corresponding to radio function associated with the KPIs while UE 115A or 115B is in an idle mode. Therefore, a user equipment device 115A or 115B can, during an idle mode period, train AI/ML models, run various radio functions based on the trained model(s) to estimate radio function information/KPI, and subsequently offer such estimated/predicted intelligence, via a novel radio API, to a RAN node during establishment of a connection with RAN 105A or 105B, leading to a faster, and more reliable network access. For example, when a user equipment device proactively offers a RAN node an expected (e.g., determined with a learning model trained while the UE is idle) best downlink beam set while the user equipment is establishing a connection to the RAN node, the RAN node may minimize delay and use of overhead resources for transmission of reference signals to a user equipment device to usable by the UE to determine the UE's determined best downlink beam by using a prospectively determined best beam. Because the UE has already proactively/prospectively offered such KPI intelligence, access delay and use of downlink/uplink signaling overhead can be reduced compared to resource use that may otherwise ensue if an indication of a best beam, predicted by a AI/ML learning model trained while the UE was idle, was not transmitted to the RAN during connection establishment.

Figure 4:
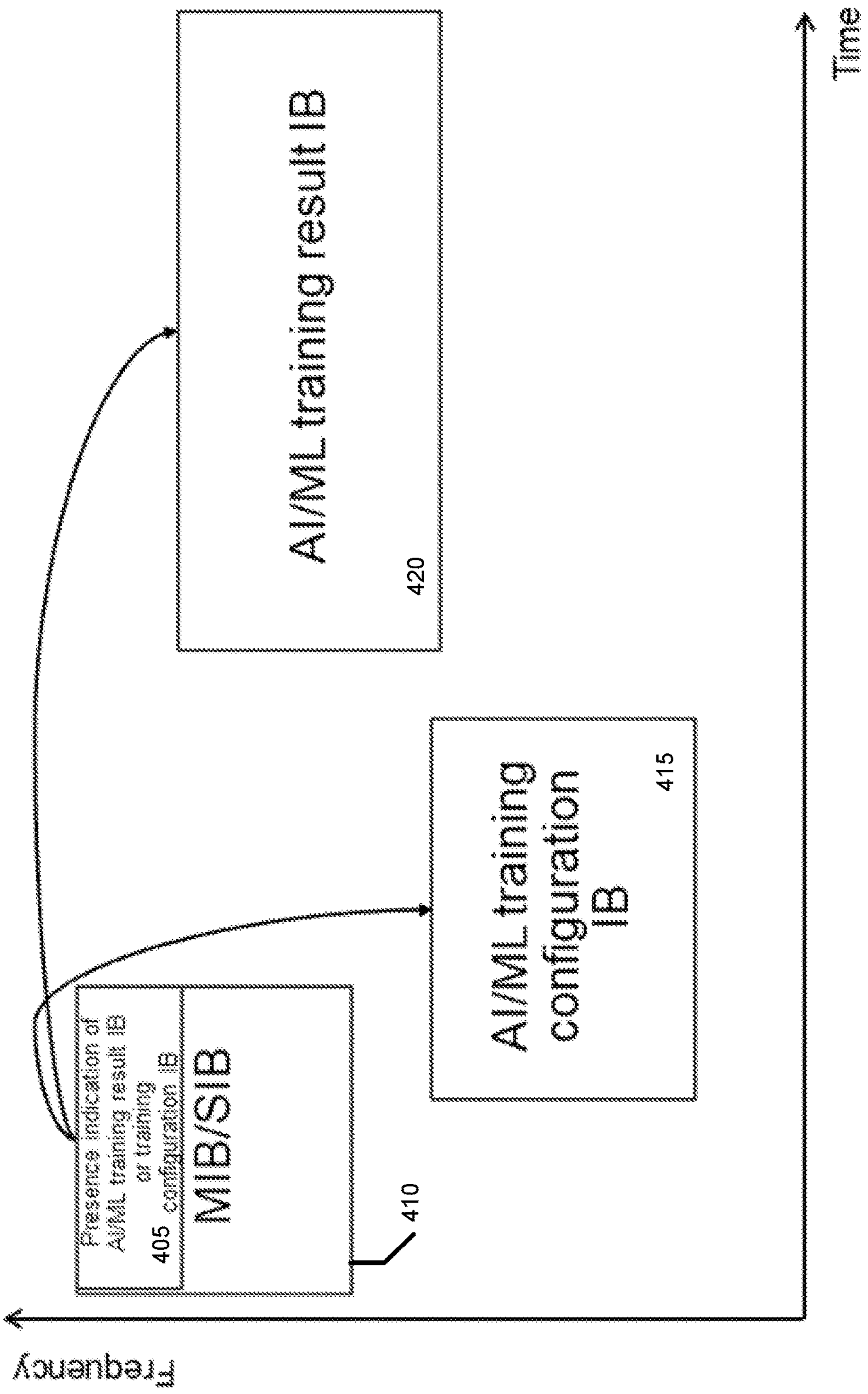
FIG. 4 illustrates an example radio resource control signal learning model configuration information block message.

Turning now to FIG. 4, the figure illustrates a learning model configuration information block message 410 that may comprise a training configuration resource indication 405 that comprises, or is indicative of, a training configuration resource to be used to broadcast, or that is usable to broadcast, by a radio access network node, a learning model training configuration, such as may be transmitted in message 500A or message 500B transmitted at act 2A or 2B as described in reference to FIG. 3. In an embodiment, training resource configuration resource indication 405 shown in FIG. 4 may comprise a training result resource indication that may comprise, or that me indicative of, a training result resource usable to transmit a determined radio function parameter value that may be determined by a RAN that may have transmitted information block message 410. Training configuration resource indication 405 may be indicative of a training configuration resource to be used to broadcast, or that is usable to broadcast, AI/ML training configuration information block message 415, which may comprise, or may be indicative of, a learning model training configuration. In an embodiment, configuration information block message 415 may be indicative of a resource, or resources to be used to transmit, or that may be usable to transmit, a learning model training configuration by a radio access network node.

Training configuration resource indication 405 may be indicative of a training result resource, or resources, to be used to broadcast, or that is/are usable to broadcast, AI/ML training result information block message 420, which may be indicative of learning model training results, or that may be indicative of resources to be used to transmit, or that may be usable to transmit, or broadcast, a learning model training result by a radio access network node, such as a result message 350A or 350B transmitted at act 5 shown in FIG. 3. It will be appreciated that message 350A may not comprise the same information as message 350B.

Continuing with description of FIG. 4, as part of a broadcast master information block ("MIB") 410, or a basic system information block ("SIB") 410, (information block 410 may be a MIB or a SIB), a RAN may indicate, via indication 405, the presence of AI/ML idle model training assistance configuration information block 415 or the presence of AI/ML results information block 420. A RAN may transmit novel presence indication 405, as part of an MIB or an SIB, to indicate the availability of novel system information block 415, or resources corresponding thereto, that may carry, or that may be indicative of a resource that may carry, an idle mode AI/ML training assistance configuration, which may be embodied in one or more example configurations described in reference to FIG. 5A, 5B, 5C, or 5D. Indication 405 may be indicative of a resource that may carry novel results system information block 420 that may carry, or that may be indicative of a resource that may carry, an idle mode AI/ML training assistance sampling result, which may be embodied in examples described in reference to FIG. 6 or 7. Upon an idle mode user equipment device determining the presence, via indication 405, of an AI/ML SIB and corresponding resource(s), the user equipment may decode, which may comprise blind decoding, one or more AI/ML configuration blocks 415 or one or more AI/ML results blocks 420, that may comprise information corresponding to one or more idle mode indicated radio functions, such as a learning model training configuration or a determined radio function parameter value.

Turning now to FIG. 5A, an idle mode AI/ML configuration 500 SIB is illustrated. Configuration 500 may be contained in an information block 415 described in reference to FIG. 4 or may be indicated by an indication contained in an information block 415 (e.g., an information block 415 may comprise configuration 500 or may indicate resources that may be used by a user equipment to receive configuration 500). Configuration 500 may comprise an identifier field 502 indicative of an AI-ML learning model, a radio function that may be implemented by an AI/ML learning model, or an AI/ML learning model feature. One or more coordinating RAN node identifier(s) in field 504 may be associated in configuration 500 with each defined radio feature 502A-502*n*, which may be indicated by a defined, or determined, feature identifier in field 502. Configuration 500 may associate training actions 506 for uplink or downlink directions, with a training feature 502 and associated coordinating RANs of a coordination group of RANs. Configuration 500 may associate training resources 508 that are usable, or that are to be used, to perform corresponding training action, or actions, 506 with corresponding RAN(s) 504 with respect to a feature 502. Thus, configuration 500 may be used to indicate to an idle model user equipment one or more AI/ML models, or features, which may be trained to be used for one or more radio functions. Configuration 500 may not necessarily instruct, or command, that a user equipment perform training actions 506 for features 502 for RAN(s) indicated in RAN filed 504.

Figure 5B:
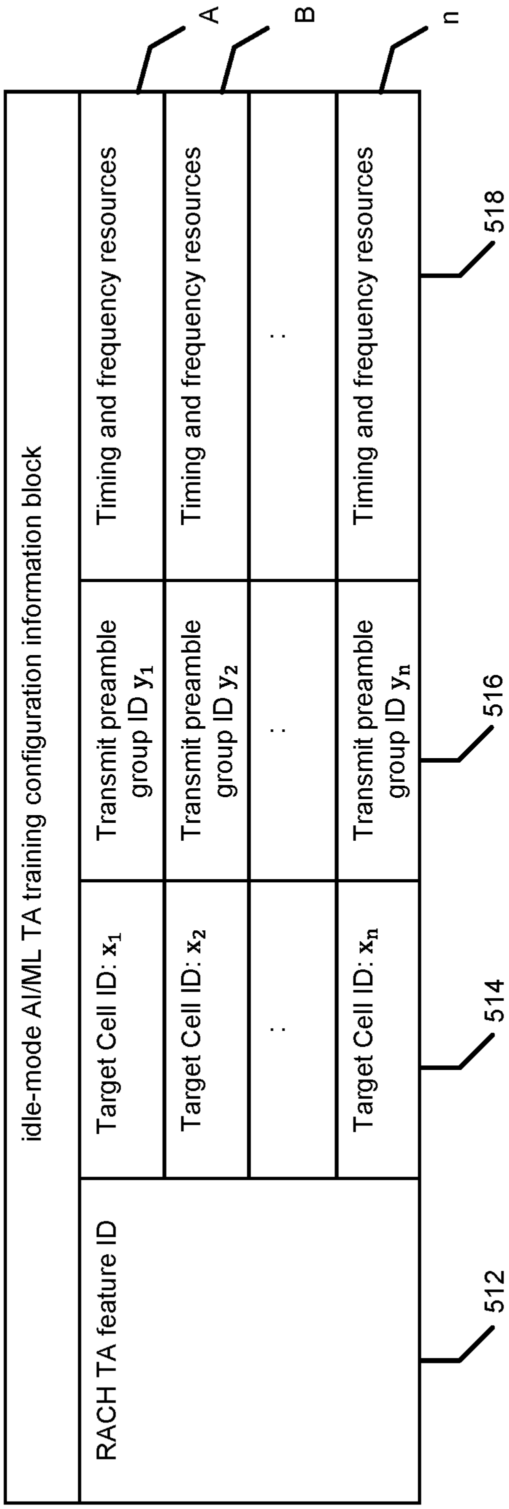
FIG. 5B illustrates an example learning model training configuration to be used to train a timing advance learning model at an IDLE mode user equipment.

In an example shown by FIG. 5B, an exemplary AI/ML a configuration contained in, or indicated by, configuration information block 510 may facilitate random-access channel ("RACH") timing advance ("TA") training of a TA learning model, or a TA learning model feature, by a feature corresponding to a feature identifier contained in feature identifier field 512. Adjacent RAN nodes in a RAN coordinating group (which may comprise two or more RAN nodes that may be adjacent or neighboring) may coordinate regarding RACH TA training resources 518A, 518B, 518*n* that user equipment may use to transmit corresponding defined TA preambles. TA preambles may be contained in, or part of, defined preamble groups indicated in preamble group field 516. A user equipment may transmit a preamble indicated in field 516 in the uplink direction towards a coordinating RAN identified in corresponding RAN field 514. A preamble group may comprise a group of defined preambles that have been configured as being associated with a given RAN 514 such that receiving by the RAN, via a resource 518 corresponding to a preamble group 516 corresponding to the given RAN, may indicate to the receiving RAN that the RAN is to determine a TA with respect to a user equipment that may have transmitted the preamble. Responsive to receiving a preamble of a TA preamble group, or TA preamble pool, the receiving RAN may train, or update, a learning model, or learning model feature, corresponding to TA acquisition. A result of the training/updating by the RAN may be transmitted to the user equipment via a result SIB. Thus, upon decoding AI/ML configuration SIB 510, an idle mode device, if interested in, or that supports AI/ML driven TA acquisition 512, may transmit an indicated uplink TA preamble, which may be selected randomly by the idle mode user equipment from a configured TA preamble group 516B, for example, toward an associated target RAN node 514B via corresponding resources 518B. Adjacent RAN nodes may coordinate with each other such that a resource indicated in field 518 to be used with respect to a RAN identified as corresponding in field 514 to the resource does not overlap (e.g., with respect to time or frequency) with a resource that an adjacent RAN may use for non-AI/ML training purposes.

In another embodiment shown in FIG. 5C, for example, AI/ML configuration information block 520 may facilitate training of channel state information ("CSI") feature 522. Coordinating RAN nodes indicated in field 524 may transmit a set of CSI beams indicated in field 526 via resources indicated in field 528. An idle mode user equipment may receive and detect received coverage levels corresponding to the beams via the corresponding resources indicated in field 528 and may subsequently train CSI AI/ML models at the user equipment. A user equipment may transmit a determined best beam result indication corresponding to a RAN identified in field 524 that sent the beam in the uplink direction via a small data transmission (e.g., according to existing techniques that facilitate idle mode devices transmitting fast, small payloads) or an idle mode user equipment device may transition to a connected mode and transmit a best beam indication as a data transmission before reverting back to idle mode.

Figure 5D:
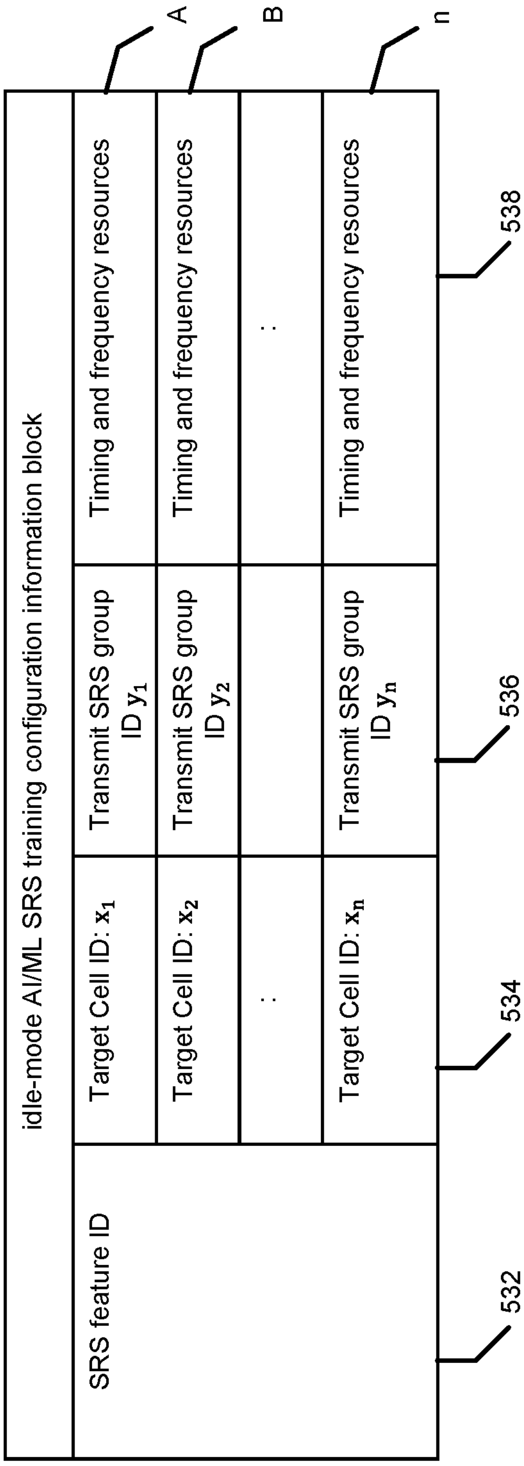
FIG. 5D illustrates an example learning model training configuration to be used to train an uplink beam selection model learning model at a radio access network node.

In another embodiment illustrated in FIG. 5D, an example AI/ML configuration block 530 may facilitate training a sounding reference signal ("SRS") learning model feature 532 at a user equipment. A training action indication 536 in configuration 530 may comprise an indication to transmit, by a used equipment while idle, configured SRS reference signal patterns via a resource 538 towards a RAN node, indicated in field 534, of an AI/ML RAN coordination group. SRS training may facilitate a RAN and user equipment optimize uplink decoding performance. Training a RAN node with respect to a user equipment regarding uplink channel conditions while the user equipment is idle can facilitate almost immediate offering of a dynamic uplink transmission configuration to the user equipment when the user equipment connects to the RAN node and establishes an uplink session. By training an SRS learning model feature while a user equipment is in idle mode, a RAN node can avoid requesting additional SRS transmissions from a transitioning user equipment. Thus, based on SRS model feature 532 being trained while a user equipment is idle, less time is spent refining uplink channel quality determination before the uplink session is established, which may lead to a faster uplink session establishment.

Figure 6:
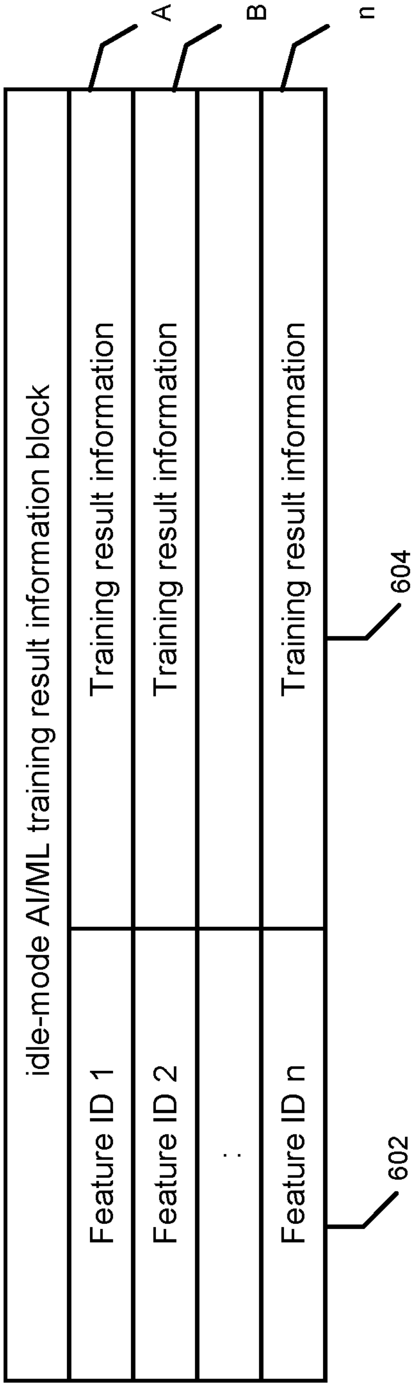
FIG. 6 illustrates an example training result information block to be used to transmit results of a training action.

Turning now to FIG. 6, an example SIB 600 for carrying AI/ML result samples is illustrated. SIB 600 may be indicated by indication 405 shown in FIG. 4 (e.g., SIB 600 may be the same as SIB 420 shown in FIG. 4). In an embodiment, SIB 600 shown in FIG. 6 may comprise an indication of a training result resource usable, or to be used, to transmit by a RAN to a UE AI/ML model training information/result, such as a determined radio function parameter value.

In an example, a training result 604A corresponding to an identified learning model feature 602 may be transmitted, or broadcast, via SIB 600 to a user equipment. One or more RAN nodes, belonging to an AI/ML training coordination group for example, may transmit, or broadcast, SIB 600 containing AI/ML training samples that may have been determined at a RAN node and that may be beneficially used by an idle mode user equipment. Thus, for a radio feature ID corresponding to an AI/ML model 602 being trained at a RAN, the RAN may transmit to a user equipment training result, or training result samples, 604 via SIB 600.

Figure 7:
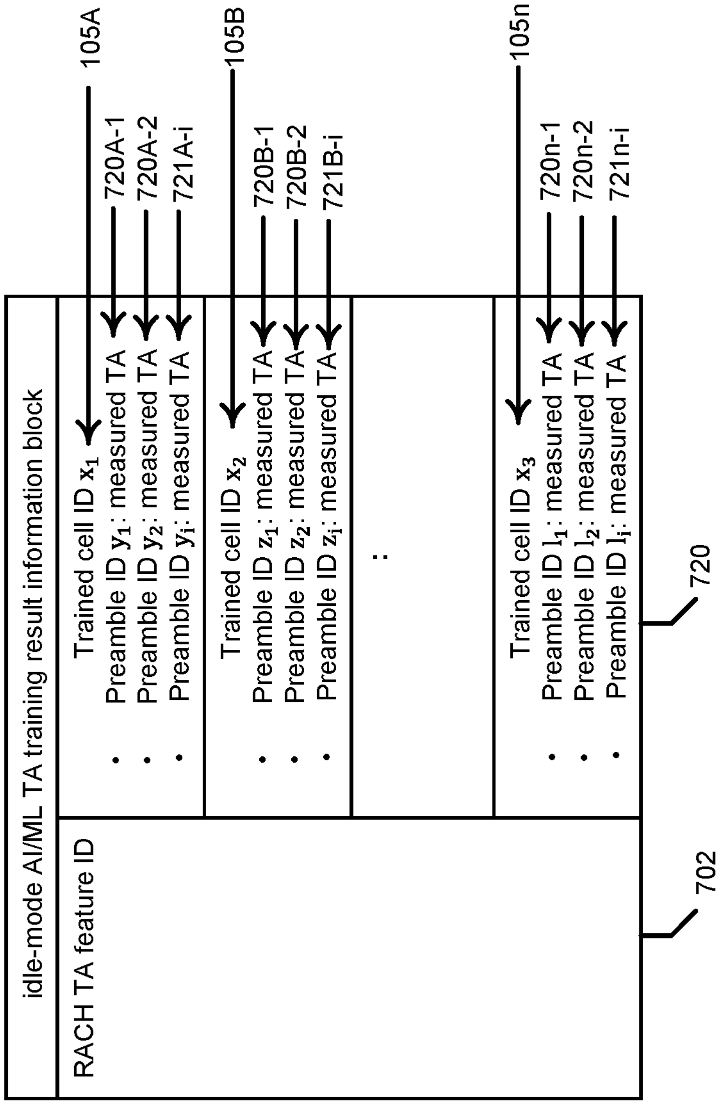
FIG. 7 illustrates an example training result information block used to transmit timing advance results.

In an embodiment illustrated in FIG. 7, an AI/ML training result SIB 700 may facilitate training of a RACH TA learning model, or training of a RACH TA learning model feature 702. For a RACH TA learning model feature, multiple information objects 720 may be indicated as corresponding to a radio access network node, such as RAN 105A or RAN 105B shown in FIG. 3, which RAN(s) may belong to, or be participants in, an AI/ML coordination group. Thus, an estimated TA level, or a TA parameter value, may report, via result SIB 700, to a UE by a RAN corresponding to a preamble indicated by indication 720. For example, if a UE shown in FIG. 3 transmits to RAN 105A a preamble selected from preamble group 516A shown in FIG. 5B (assuming for the example that RAN 105A is identified in field 514A of configuration 510 shown in FIG. 5B), RAN 105A may be identified in field 720 of SIB 700. RAN 105A may return to the UE TA result 720A-1 indicative of a TA that results from performance, by RAN 105A, of an AI/ML training operation based on receiving preamble $y_1$ from the UE while the UE was in idle mode. RAN 105A may also return results 720A-2 or 720A-iI if the UE transmitted preambles $y_2$ or $y_i$, respectively, while in idle mode. Accordingly, an AI/ML capable user equipment device may receive and decode, while in idle mode and according to resources indicated by, for example, indication 405 of MIB 410 (shown in FIG. 4), result SIB 700 and extract therefrom a TA level corresponding to one or more RAN nodes to which the UE may have transmitted one or more preambles 516 (shown in FIG. 5B).

Figure 8:
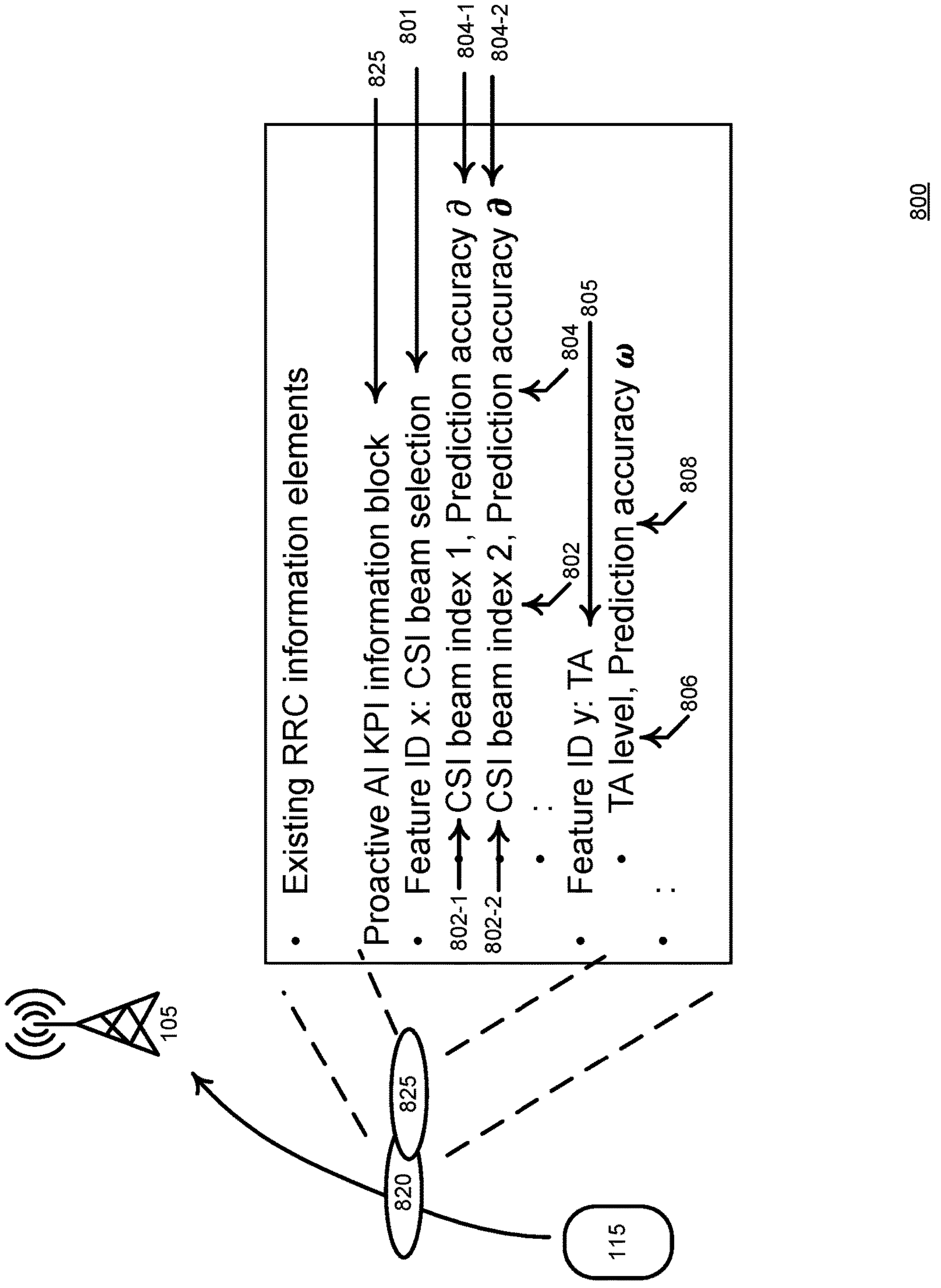
FIG. 8 illustrates an example radio resource control signal message connection establishment message that comprises a preferred beam as determined by a user equipment.

Turning now to FIG. 8, a radio API signaling message environment 800 is illustrated. Message 820 may carry proactively/prospectively determined AI/ML model output radio estimates from user equipment device 115 to RAN node 105 in novel message portion 825. For example, when user equipment device 115 is transitioning from an idle mode to a connected mode with RAN 105, the user equipment may proactively offer one or more radio KPI estimates proactively to the RAN node. The one or more KPI(s) may be generated by AI/ML models trained while user equipment 115 is idle. The trained models may be models that implement one or more radio functions. In the example shown in FIG. 8, user equipment device 115 may indicate to RAN 105 via novel API portion 825 of an RRC message 820 an AI/ML-estimated best downlink CSI beam having beam index 802, corresponding to trained beam feature 801, via which the user equipment expects (e.g., based on a trained AI/MNL model) to receive the best coverage level with respect to other downlink beams corresponding to RAN 105. UE 115 may also transmit in novel API portion 825 an expected/predicted uplink timing advance value 806 corresponding to trained feature 805. An indication of a best beam index 802 may correspond to a predicted beam prediction accuracy 804 (determined by an AI/ML model trained while the UE is idle) and an indication of a TA 806 may correspond to a predicted TA accuracy 808 (determined by an AI/ML model trained while the UE is idle).

Thus, session establishment, or connection establishment, between UE 115 and RAN 105 may be based on proactively/prospectively determined (e.g., determined while the UE is idle) information and KPI elements, and accordingly the RAN may avoid triggering a CSI beam refinement procedure or an uplink timing advance acquisition procedure during session establishment since the UE device has already proactively provided the predicted KPI(s) to the RAN. As part of AI KPI information block 825 that may be transmitted during RRC connection request signaling 820, UE 115 may signal the achievable prediction accuracy 804 or 808 corresponding to an AI/ML model that generated the respective predicted KPI 802 or 806. Because the AI/ML model may have been trained at the device while in idle mode, during which RAN 105 is typically not aware of an AI/ML model's performance, the RAN can use accuracy predictions 804 or 808 to determine whether to use estimated KPI 802 or 806, respectively. Thus, the novel KPI information elements 802 and 806, and corresponding accuracy information elements 804 and 808, may facilitate RAN determining whether AI models at UE 115, which may be used for generating the predictive KPI information elements, are operating satisfactorily. If a reported prediction accuracy level 804 or 806 is low, (e.g., below a threshold configured at RAN 105), the RAN may disregard corresponding KPI 802 or 806 received from UE 115, and instead trigger a conventional radio procedure (e.g., determining beam selection via beam sweeping or TA acquisition during RRC connection establishment) for establishing the device connection. As an example, RAN 105 may overwrite and disregard signaled best beam indication 802-1 or 802-2 if respective accuracy 804-1 or 804-2 do not satisfy a configured threshold), and conventionally trigger the beam refinement procedures during connection establishment.

Figure 9:
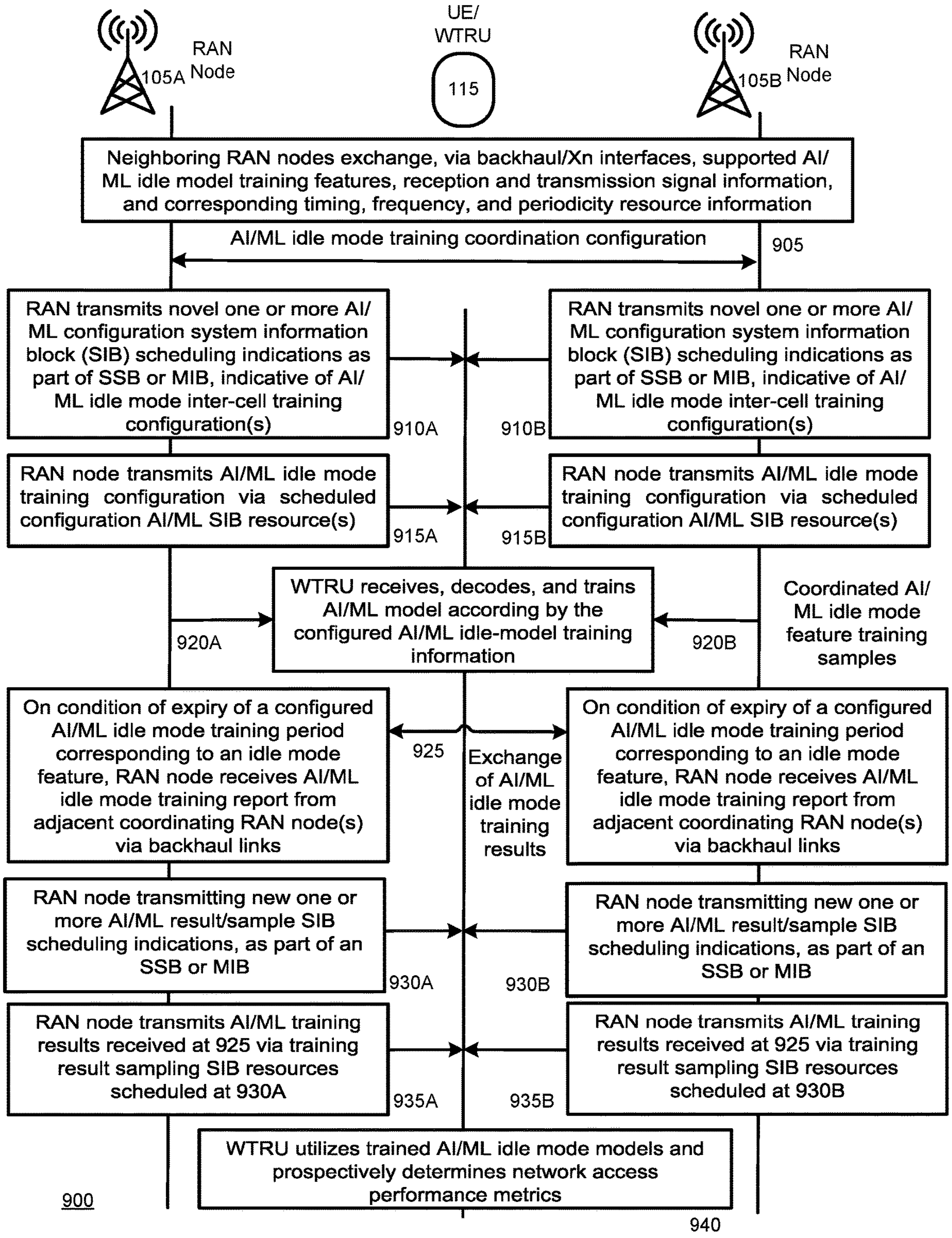
FIG. 9 illustrates a timing diagram of an example method to train a user equipment while in an idle mode.

Turning now to FIG. 9, the figure illustrates a timing diagram of an example method 900. At act 905, neighboring RAN nodes 105A and 105B may exchange with each other via backhaul/Xn interfaces, supported AI/ML model training features that can be trained while UE 115 is idle. Information exchanged at act 905 may comprise specific reception and transmission signal information corresponding to each coordinating RAN 105A or 105B. Information exchanged at act 905 may comprise timing, frequency, and periodicity information corresponding to RAN 105A or 105B. At acts 910A or 905B, RAN nodes 105A or 105B, respectively, may transmit to UE 115 novel AI/ML configuration system information block scheduling indications (e.g., indication 405 shown in FIG. 4), as part of a synchronization signal block (SSB) an/or as part of master information block (e.g., as part of information block 410 shown in FIG. 4). The novel indications transmitted at acts 910A or 910B may comprise idle mode inter-cell training configuration indications. At acts 915A and 915B shown in FIG. 9, RAN nodes 105A and 105B may transmit to UE 115 AI/ML idle mode training configurations (e.g., configuration 500 shown in FIG. 5A) via a first scheduled configuration AI/ML SIB resource (e.g., a resource corresponding to information block 415 shown in FIG. 4). At act 920A or 920B, UE 115 may receive, decode, or train an AI/ML model according to a configuration received at act 915A or 915B.

On condition of expiry of a configured AI/ML idle mode training period of a certain AI/ML feature to be trained during an idle mode of UE 115, RAN nodes 105A or 105B may receive at act 925 one or more AI/ML idle mode training report(s) from each other via backhaul links. At acts 930A or 930B, RAN nodes 105A or 105B may transmit one or more novel AI/ML result system information block scheduling indications to UE 115 as part of a synchronization signal block and/or a master information block, which may be indicative of resources scheduled to transmit AI/ML idle mode inter-cell training result samples (e.g., information exchanged at act 925) to UE 115. The indication referred to at act 930A or 930B may correspond to, or may be, indication 405 shown in FIG. 4. At act 935A or 935B shown in FIG. 9, RAN node 105A or 105B may transmit one or more AI/ML training result samples via a second scheduled AI/ML training result sampling SIB resource (e.g., a resource corresponding to training result information block 420 shown in FIG. 4.) At act 940 shown in FIG. 9, UE 115 may use prospectively determined AI/ML performance metrics determine while the UE was in idle mode, for example a prospectively determined TA and corresponding accuracy metric, to establish a connection to RAN 105A or RAN 105B.

Figure 10:
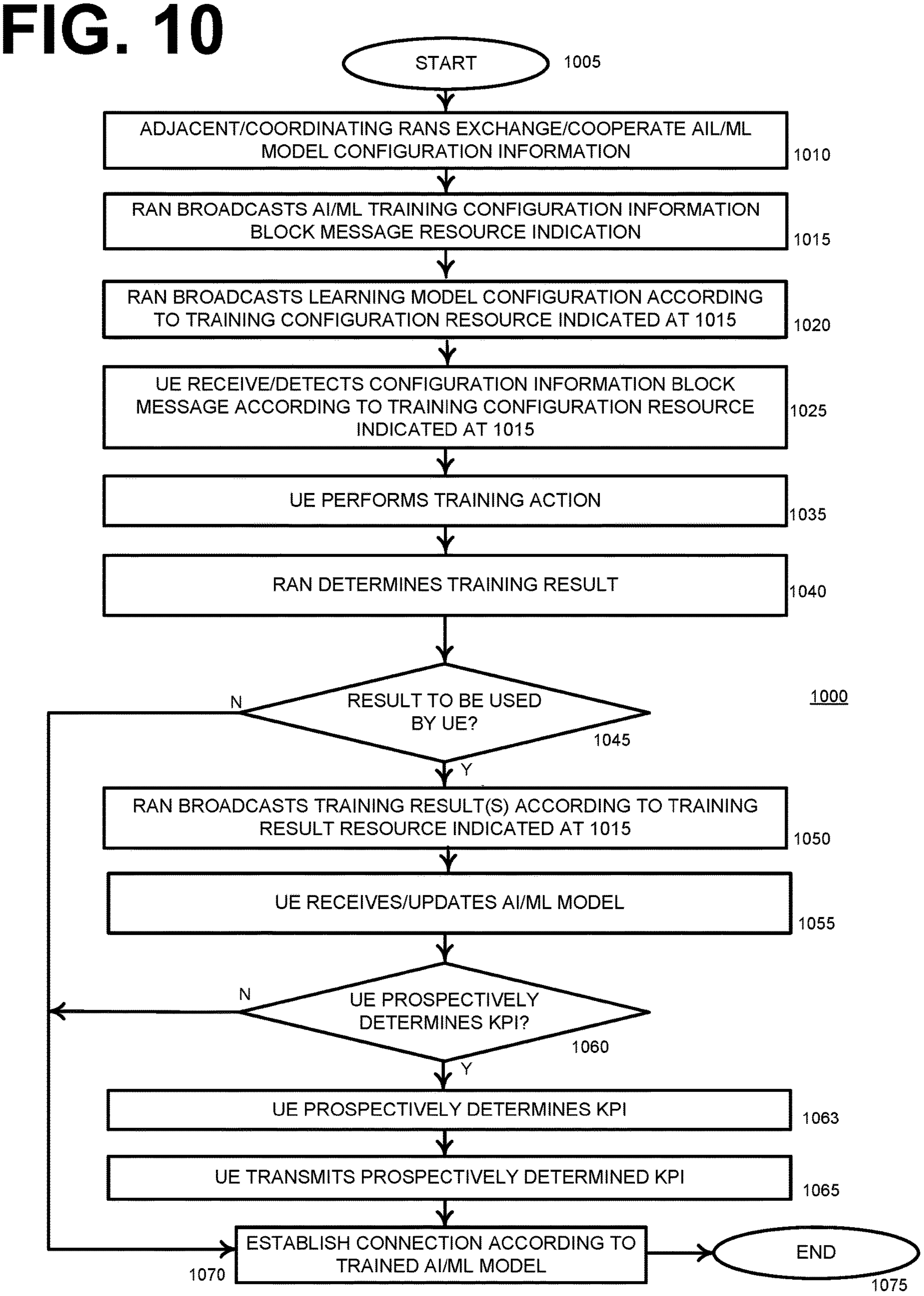
FIG. 10 illustrates a flow diagram of an example method to train a user equipment while in an idle mode.

Turning now to FIG. 10, the figure illustrates a flow diagram of an example method 1000. Method 1000 begins at act 1005. At act 1010, a radio access network node may determine learning model configuration information, or a group of adjacent radio access network nodes may cooperate, or coordinate, with each other and exchange learning model configuration information. The learning model configuration information determined, or exchanged may comprise indications of radio functions that may be implemented by, or facilitated by, one or more learning models at a radio access network node or at a user equipment. The learning model configuration information determined or exchanged may correspond to resources that may be used by a coordinating radio access network node to broadcast a learning model configuration, or a learning model result, for receiving by an idle mode user equipment. The learning model configuration information determined or exchanged may correspond to radio function learning models that may be trained using information resulting from a training action performed while a user equipment is idle. The training action may comprise one or more actions performable by a user equipment while the user equipment is idle. The training action may comprise one or more actions performable by a radio access network node while the user equipment is idle. Examples of training actions may comprise transmitting a preamble 516 described in reference to FIG. 5B, receiving CSI reference signal identifiers 526 described in reference to FIG. 5C, or transmitting an SRS group identifier 536 described in reference to FIG. 5D.

Continuing with description of FIG. 10, at act 1015, a radio access network node that determined configuration information, or coordinated with another radio access network node to determine configuration information, at act 1010 may broadcast a training configuration information block message resource indication, for example indication 405 described in reference to FIG. 4 in an MIB 410. Continuing with description of FIG. 10, at act 1020, a radio access network node may broadcast a learning model configuration, for example configuration 500 described in reference to FIG. 5A, in a training configuration information block, for example information block 415 described in reference to FIG. 4, via a resource indication indicated in indication 405.

Continuing with description of FIG. 10, at act 1025, a user equipment may receive and detect a configuration information block according to a training configuration resource indicated at act 1015, for example according to a training configuration resource indicated in indication 405 described in reference to FIG. 4. Continuing with description of FIG. 10, at act 1035, a user equipment may perform a training action indicated in a learning model configuration that was broadcast in the learning model configuration information block. The learning model configuration information block, or a learning model configuration contained therein, may comprise indications of more than one training action corresponding to more than one learning model, or learning model feature corresponding to a radio function that may be implemented by a learning model. The user equipment at act 1035 may decide to do none, one, more, or all training actions indicated in a learning model configuration. At act 1040, based on, or responsive to, performing by the user equipment of a training action indicated in a learning model configuration, the radio access network node that transmitted the learning model configuration, or another radio access network node that may have cooperated at act 1010 with the radio access network node that broadcast the learning model configuration, may determine a training result.

At act 1045, a radio access network node that determined the training result at act 1040 may determine whether the determined training result should be broadcast, transmitted, or otherwise provided to the user equipment that performed the training action at act 1035. A determination made at act 1045 may comprise a determination of whether a training result determined at act 1040 should be broadcast, transmitted, or otherwise provided to a user equipment other than the user equipment that performed the training action at act 1035. If a determination is made at act 1045 that a training result determined at 1040 does not need to be provided to a user equipment, method 1000 may advance to act 1070. At act 1070, the radio access network node and the user equipment that performed the training action at act 1035 may establish a communication connection according to a learning model that may have been trained based on the training action performed by the user equipment at act 1035. It will be appreciated that during performance of at least act 1015 through the performance of act 1045, the user equipment may be in an idle mode, or may otherwise not have had an established connection with the radio access network node with which establishment of a connection may be initiated at act 1070. Accordingly, establishing a connection at act 1070 may comprise transmitting and receiving radio resource control signal messages. After a connection between the user equipment that performed, while idle, the training action at act 1035 and a radio access network node is established at act 1070, method 1000 advances to act 1075 and ends.

Returning to description at act 1045, if a determination is made by a radio access network node, which determined the training result at 1040, that a user equipment may need to receive the training result determined at act 1040, method 1000 advances to act 1050. At act 1050, the radio access network node that determined the training result at act 1040 may broadcast a training result determined at act 1045, to be received by, or detected by, a user equipment that performed the training action at act 1035, according to a training result resource that may have been indicated in the training configuration information block message broadcast at act 1015. Thus, in addition to the training model configuration information block message resource indication transmitted, or broadcast, at act 1015 being indicative of a resource usable to transmit, or broadcast, a configuration information block at act 1020 (e.g., in addition to indication 405 described in reference to FIG. 4 being indicative of a resource usable to transmit configuration 500 described in reference to FIG. 5 via training configuration information block 415 described in refence to FIG. 4), the training configuration information block message resource indication, for example indication 405 described in reference to FIG. 4, transmitted at act 1015, may also comprise an indication of a training resource usable, or to be used, by the radio access network node that determined, at act 1040, the training result to broadcast the training result at 1050. Act 1055, a user equipment may receive the training result, or training results, broadcast at act 1050 according to a training result resource that may have been indicated in a training configuration information block message resource indication broadcast at 1015, for example according to a resource that may have been indicated in indication 405 described in reference to FIG. 4. The user equipment may use the training result received at 1055 to update, or train, a learning model, or a learning model feature, corresponding to the training action performed at act 1035.

At act 1060, in an embodiment, a user equipment may determine to use an updated, or trained learning model, that may have been trained, or updated, based on, according to, or responsive to, the performing of the training action at act 1035, or may have been trained, or updated, based on, according to, or responsive to the training result received at act 1055, to prospectively determine one or more key performance indicator(s). For example, a training action performed at act 1035 may comprise a user equipment transmitting a preamble to be used by a radio access network node to train a timing advance machine learning model, or a timing advance machine learning model feature. A result of training a machine learning model or a machine learning model feature, associated with determining a timing advance, may result in a model parameter result, which was determined by the radio access network node at act 1045, to be provided to the user equipment at act 1050. The user equipment, after updating a timing advance machine learning model, or a timing advance machine learning model feature, may use the updated/trained timing advanced machine learning model or updated/trained timing advanced machine learning model feature to prospectively determine, at act 1063, a timing advance with respect to a radio access network node that may have determined, or that may have cooperated to determine, at act 1010, learning model configuration information. The term 'prospectively' (the term 'proactively' may be used interchangeably herein) is used in the sense that a user equipment that is prospectively determining a timing advance may be in an idle mode and may be determining the timing advance before initiating establishment of, or before attempting to establish, a connection with a radio access network node that may have determined, or cooperated to determine, machine learning model configuration information at act 1010.

At act 1065, a user equipment that prospectively determined, at act 1063, a key performance indicator, or key performance indicators, may transmit, to a radio access network node, the prospectively determined KPI, or prospectively determined KPIs, before or during connection establishment procedures performed at act 1070, thus avoiding determining of the key performance indicator, or key performance indicators, such as, for example, a timing advance or best beam selection, during connection establishment at act 1070. Upon establishing a connection at act 1070, method 1000 advances to act 1075 and ends.

Figure 11:
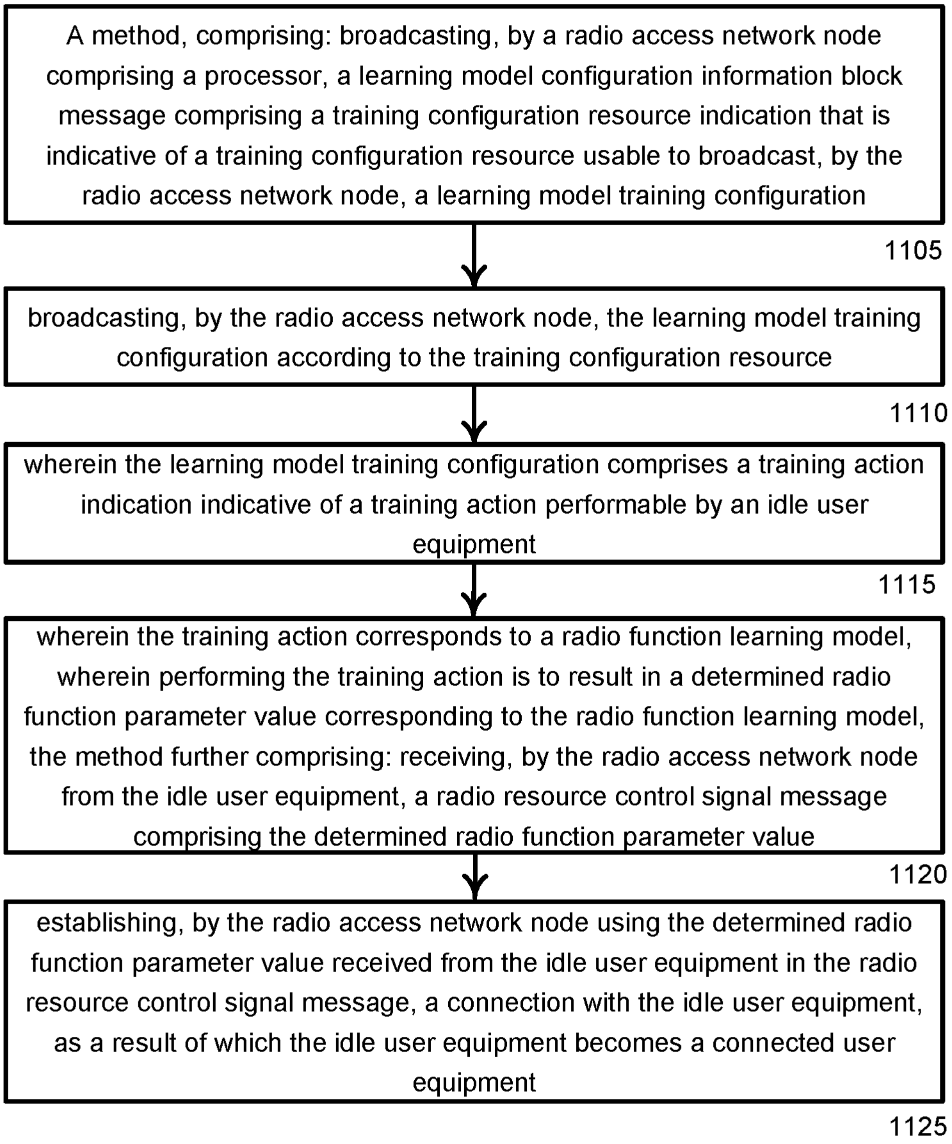
FIG. 11 illustrates a block diagram of an example method.

Turning now to FIG. 11, the figure illustrates an example embodiment method 1100 comprising at block 1105 broadcasting, by a radio access network node comprising a processor, a learning model configuration information block message comprising a training configuration resource indication that is indicative of a training configuration resource usable to broadcast, by the radio access network node, a learning model training configuration; at block 1110 broadcasting, by the radio access network node, the learning model training configuration according to the training configuration resource; at block 1115 wherein the learning model training configuration comprises a training action indication indicative of a training action performable by an idle user equipment; at block 1120 wherein the training action corresponds to a radio function learning model, wherein performing the training action is to result in a determined radio function parameter value corresponding to the radio function learning model, the method further comprising: receiving, by the radio access network node from the idle user equipment, a radio resource control signal message comprising the determined radio function parameter value; and at block 1125 establishing, by the radio access network node using the determined radio function parameter value received from the idle user equipment in the radio resource control signal message, a connection with the idle user equipment, as a result of which the idle user equipment becomes a connected user equipment.

Figure 12:
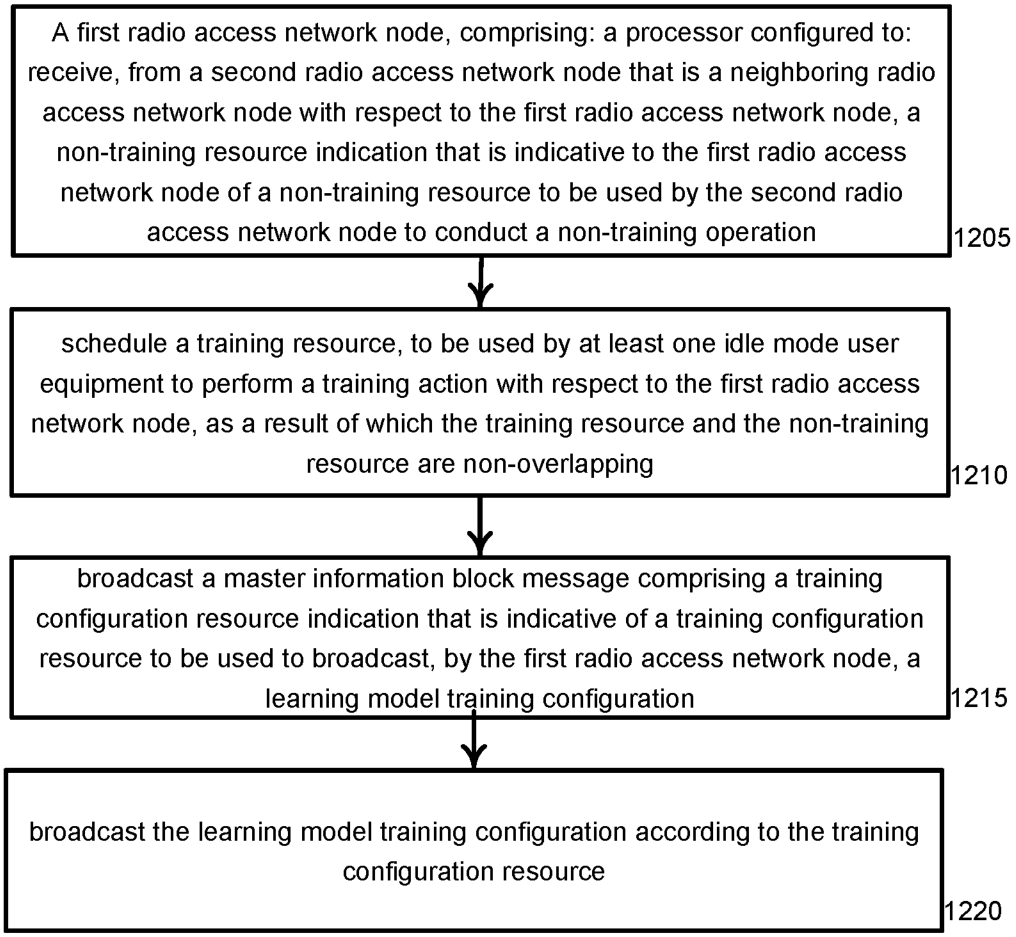
FIG. 12 illustrates a block diagram of an example first radio access network node.

Turning now to FIG. 12, the figure illustrates a first radio access network node 1200, comprising at block 1205 a processor configured to receive, from a second radio access network node that is a neighboring radio access network node with respect to the first radio access network node, a non-training resource indication that is indicative to the first radio access network node of a non-training resource to be used by the second radio access network node to conduct a non-training operation; at block 1210 schedule a training resource, to be used by at least one idle mode user equipment to perform a training action with respect to the first radio access network node, as a result of which the training resource and the non-training resource are non-overlapping; at block 1215 broadcast a master information block message comprising a training configuration resource indication that is indicative of a training configuration resource to be used to broadcast, by the first radio access network node, a learning model training configuration; and at block 1220 broadcast the learning model training configuration according to the training configuration resource.

Figure 13:
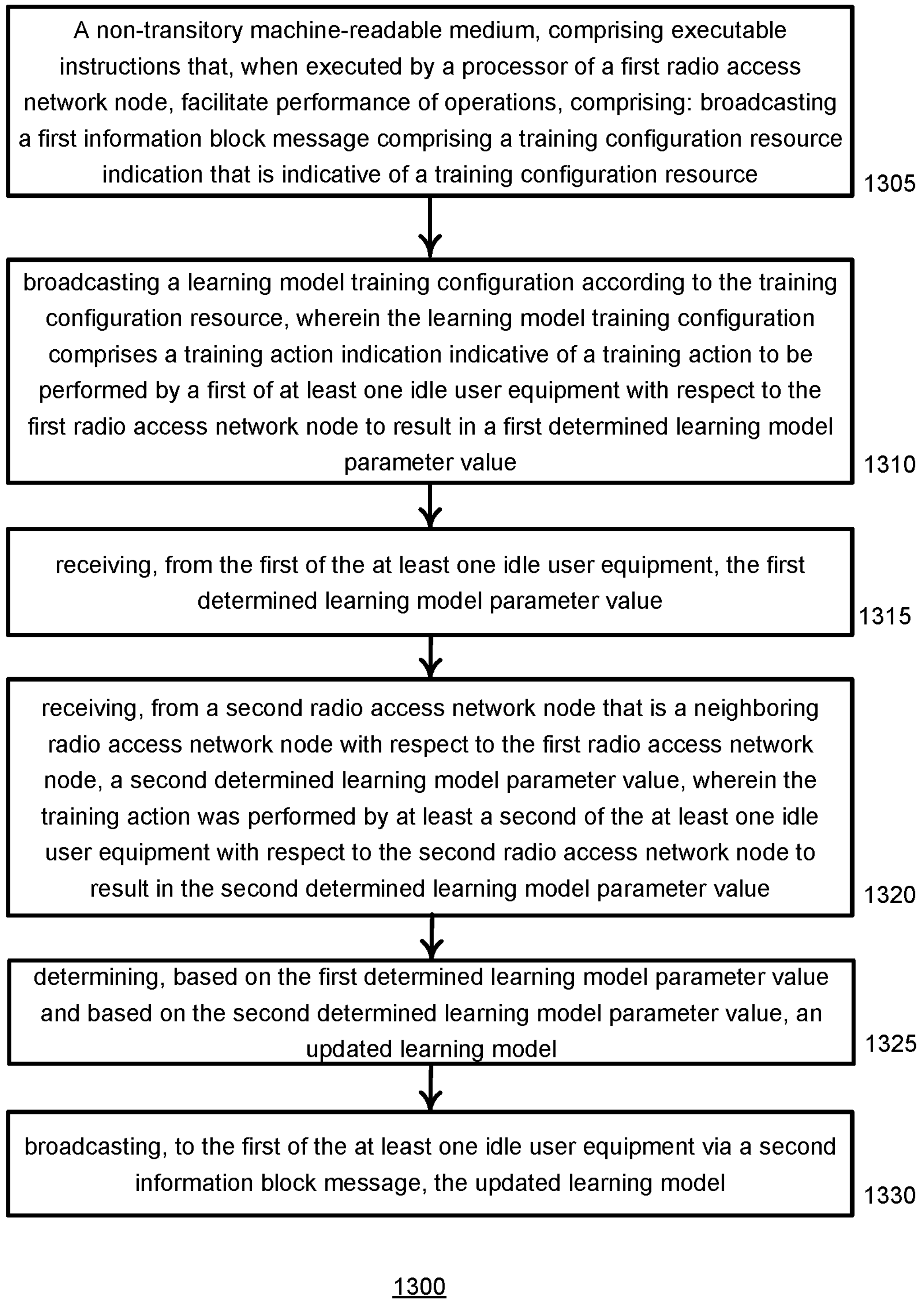
FIG. 13 illustrates a block diagram of an example non-transitory machine-readable medium.

Turning now to FIG. 13, the figure illustrates a non-transitory machine-readable medium 1300 comprising at block 1305 executable instructions that, when executed by a processor of a first radio access network node, facilitate performance of operations, comprising broadcasting a first information block message comprising a training configuration resource indication that is indicative of a training configuration resource; 1310 broadcasting a learning model training configuration according to the training configuration resource, wherein the learning model training configuration comprises a training action indication indicative of a training action to be performed by a first of at least one idle user equipment with respect to the first radio access network node to result in a first determined learning model parameter value; at block 1315 receiving, from the first of the at least one idle user equipment, the first determined learning model parameter value; at block 1320 receiving, from a second radio access network node that is a neighboring radio access network node with respect to the first radio access network node, a second determined learning model parameter value, wherein the training action was performed by at least a second of the at least one idle user equipment with respect to the second radio access network node to result in the second determined learning model parameter value; at block 1325 determining, based on the first determined learning model parameter value and based on the second determined learning model parameter value, an updated learning model; and at block 1330 broadcasting, to the first of the at least one idle user equipment via a second information block message, the updated learning model.

Figure 14:
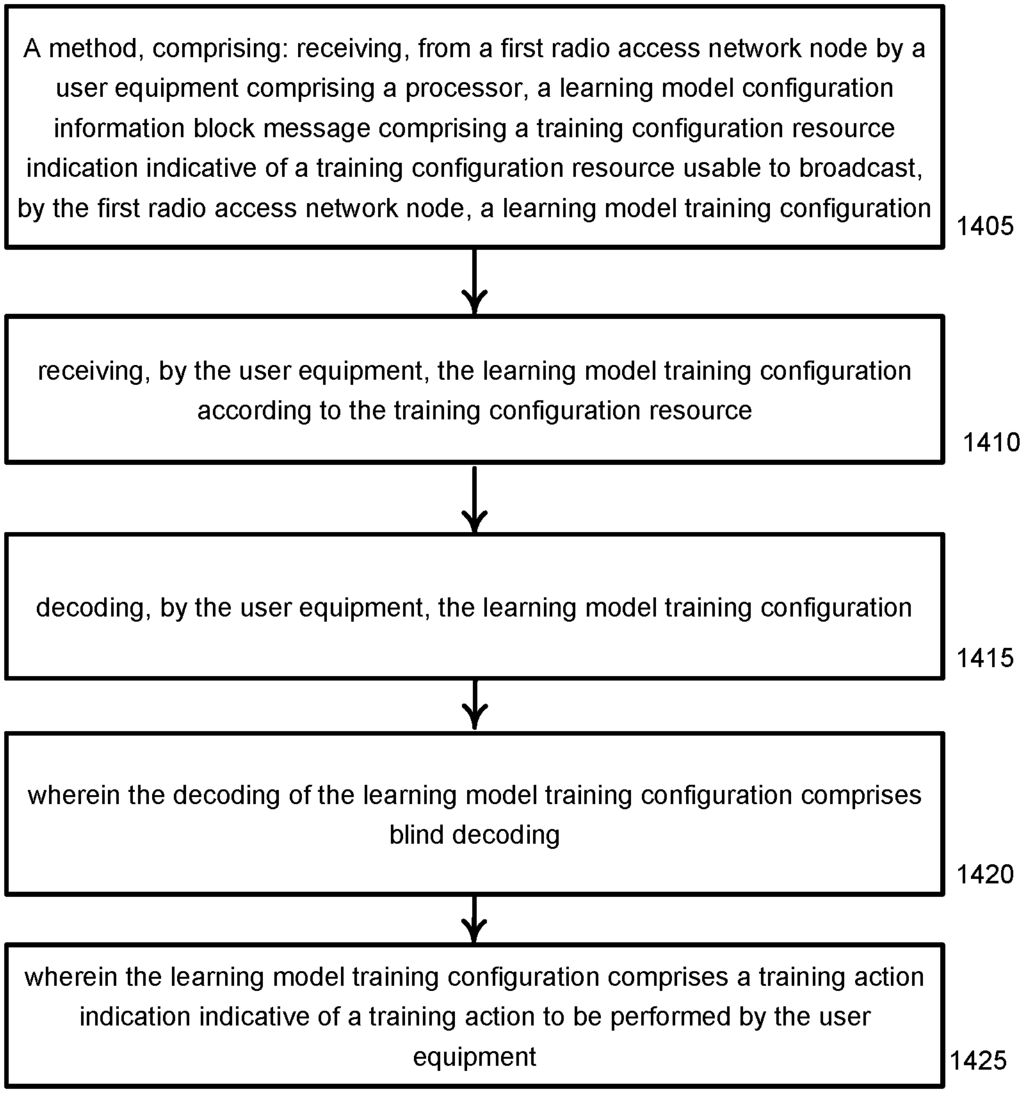
FIG. 14 illustrates a block diagram of an example method.

Turning now to FIG. 14, the figure illustrates an example embodiment method 1400 comprising at block 1405 receiving, from a first radio access network node by a user equipment comprising a processor, a learning model configuration information block message comprising a training configuration resource indication indicative of a training configuration resource usable to broadcast, by the first radio access network node, a learning model training configuration; at block 1410 receiving, by the user equipment, the learning model training configuration according to the training configuration resource; at block 1415 decoding, by the user equipment, the learning model training configuration; at block 1420 wherein the decoding of the learning model training configuration comprises blind decoding; and at block 1425 wherein the learning model training configuration comprises a training action indication indicative of a training action to be performed by the user equipment.

Figure 15:
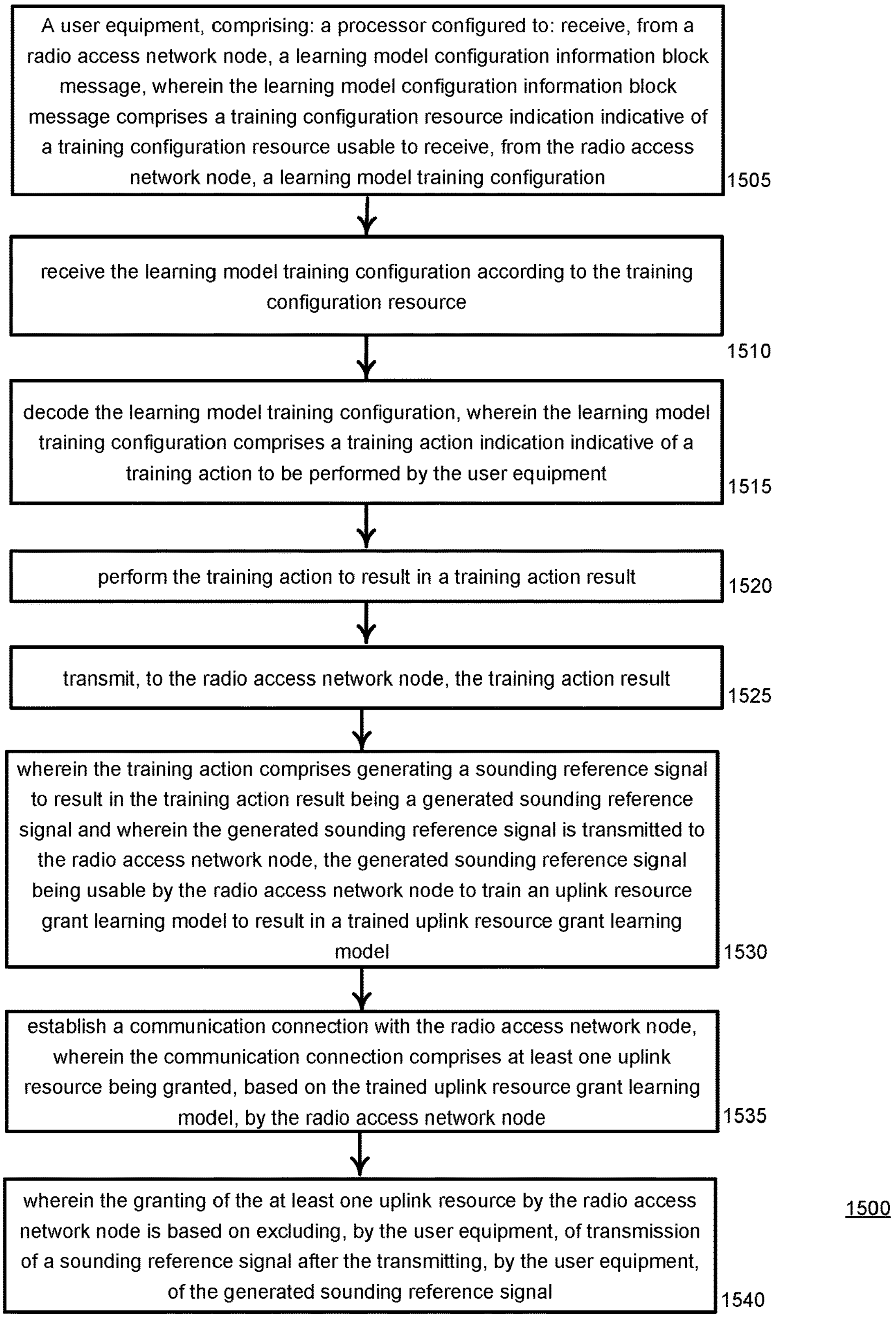
FIG. 15 illustrates a block diagram of an example user equipment.

Turning now to FIG. 15, the figure illustrates an example user equipment 1500, comprising at block 1505 a processor configured to receive, from a radio access network node, a learning model configuration information block message, wherein the learning model configuration information block message comprises a training configuration resource indication indicative of a training configuration resource usable to receive, from the radio access network node, a learning model training configuration; at block 1510 receive the learning model training configuration according to the training configuration resource; at block 1515 decode the learning model training configuration, wherein the learning model training configuration comprises a training action indication indicative of a training action to be performed by the user equipment; at block 1520 perform the training action to result in a training action result; at block 1525 transmit, to the radio access network node, the training action result; at block 1530 wherein the training action comprises generating a sounding reference signal to result in the training action result being a generated sounding reference signal and wherein the generated sounding reference signal is transmitted to the radio access network node, the generated sounding reference signal being usable by the radio access network node to train an uplink resource grant learning model to result in a trained uplink resource grant learning model; at block 1535 establish a communication connection with the radio access network node, wherein the communication connection comprises at least one uplink resource being granted, based on the trained uplink resource grant learning model, by the radio access network node; and at block 1540 wherein the granting of the at least one uplink resource by the radio access network node is based on excluding, by the user equipment, of transmission of a sounding reference signal after the transmitting, by the user equipment, of the generated sounding reference signal.

Figure 16:
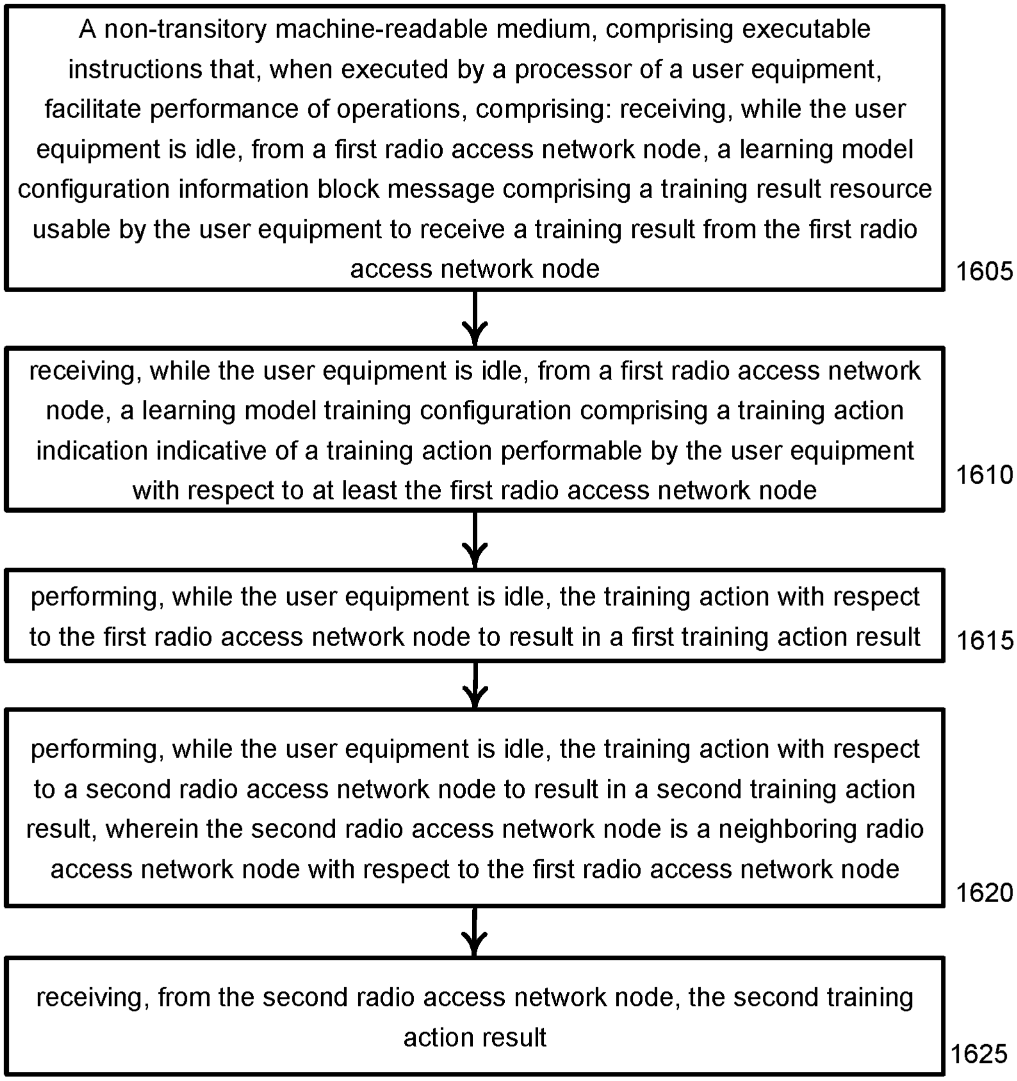
FIG. 16 illustrates a block diagram of an example non-transitory machine-readable medium.

Turning now to FIG. 16, the figure illustrates a non-transitory machine-readable medium 1600 comprising at block 1605 executable instructions that, when executed by a processor of a user equipment, facilitate performance of operations, comprising receiving, while the user equipment is idle, from a first radio access network node, a learning model configuration information block message comprising a training result resource usable by the user equipment to receive a training result from the first radio access network node; at block 1610 receiving, while the user equipment is idle, from a first radio access network node, a learning model training configuration comprising a training action indication indicative of a training action performable by the user equipment with respect to at least the first radio access network node; at block 1615 performing, while the user equipment is idle, the training action with respect to the first radio access network node to result in a first training action result; at block 1620 performing, while the user equipment is idle, the training action with respect to a second radio access network node to result in a second training action result, wherein the second radio access network node is a neighboring radio access network node with respect to the first radio access network node; and at block 1625 receiving, from the second radio access network node, the second training action result.

Figure 17:
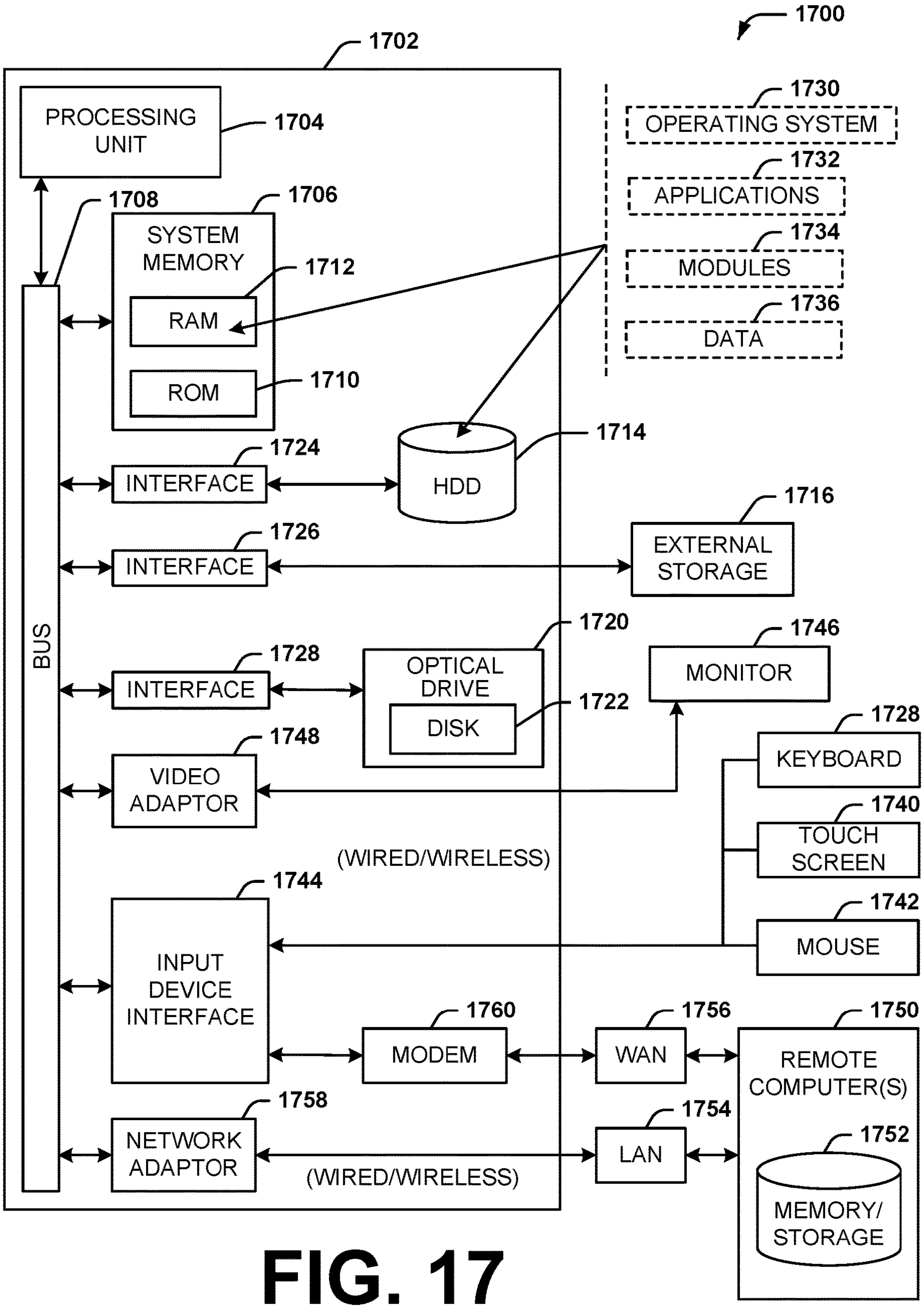
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
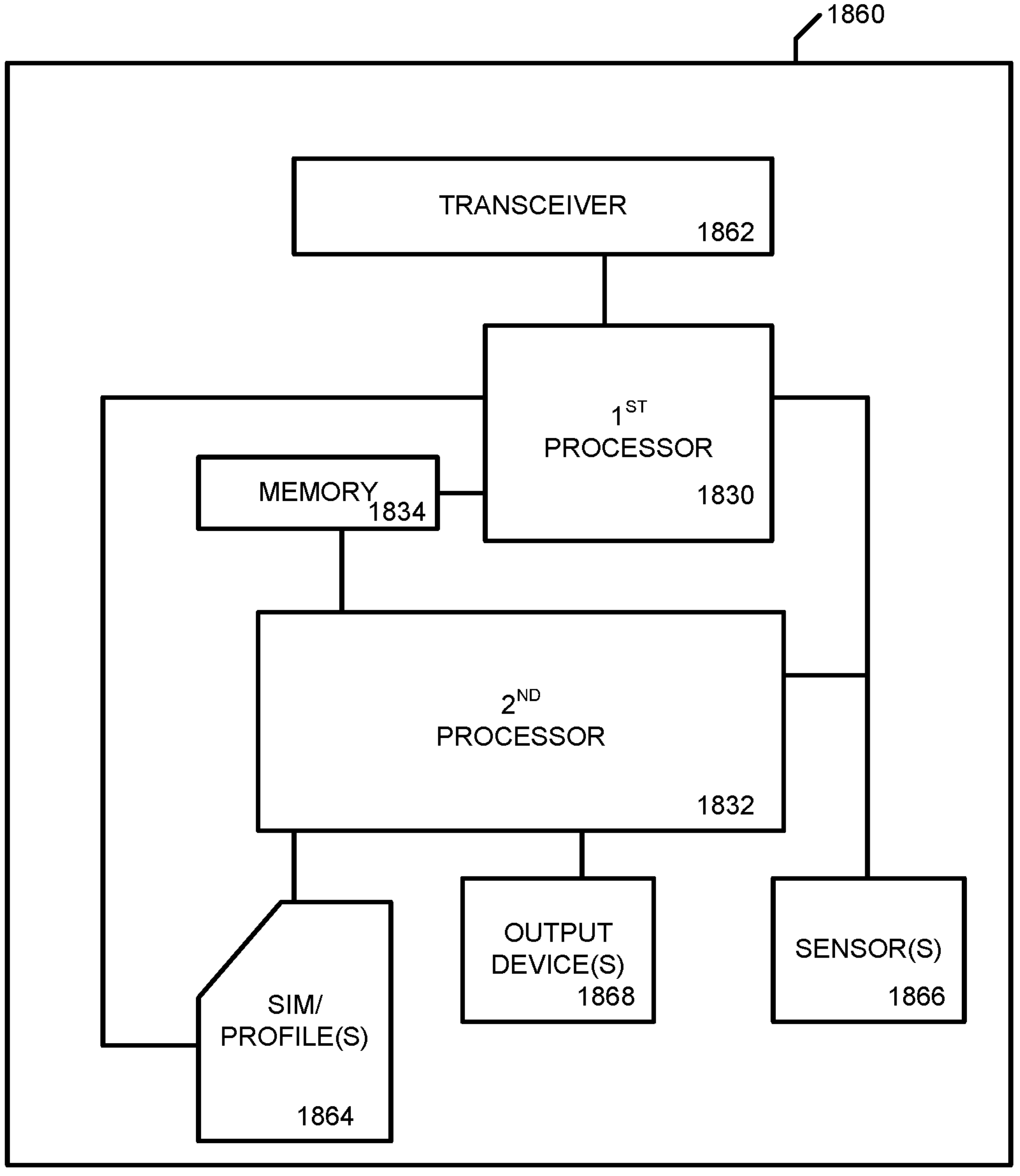
FIG. 18 illustrates a block diagram of an example wireless user equipment.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, which are external to UE 1860.

The following glossary of terms given in Table 2 may apply to one or more descriptions of embodiments disclosed herein.

TABLE 2

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |

TABLE 2-continued

| Term | Definition |
|---|---|
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

broadcasting, by a radio access network node comprising at least one processor, a learning model configuration information block message comprising a training configuration resource indication that is indicative of a training configuration resource to result in an indicated training configuration resource, usable by the radio access network node, to broadcast a learning model training configuration and usable by at least one idle user equipment operating in at least one idle mode to receive the learning model training configuration, wherein the learning model configuration information block message is to be receivable by the at least one idle user equipment operating in the at least one idle mode; and broadcasting, by the radio access network node, the learning model training configuration according to the indicated training configuration resource, wherein the training configuration resource comprises a time or frequency resource.

2. The method of claim 1, wherein the learning model training configuration comprises a training action indication indicative of a training action performable by the at least one idle user equipment.

3. The method of claim 1, wherein the learning model training configuration comprises a training action indication indicative of a training action, wherein the training action corresponds to a radio function learning model, wherein performing the training action is to result in a determined radio function parameter value corresponding to the radio function learning model, and wherein the learning model configuration information block message further comprises a training result resource indication that is indicative of a training result resource usable to transmit the determined radio function parameter value, the method further comprising:

transmitting, by the radio access network node to the at least one idle user equipment, the determined radio function parameter value according to the indicated training result resource.

4. The method of claim 2, wherein the training action corresponds to a radio function learning model, wherein performing the training action is to result in a determined radio function parameter value corresponding to the radio function learning model, the method further comprising:

receiving, by the radio access network node from the at least one idle user equipment, a radio resource control signal message comprising the determined radio function parameter value; and establishing, by the radio access network node using the determined radio function parameter value received from the at least one idle user equipment in the radio resource control signal message, a connection with the at least one idle user equipment, as a result of which the at least one idle user equipment becomes at least one connected user equipment.

5. The method of claim 4, wherein the determined radio function parameter value comprises a timing advance value corresponding to a timing advance corresponding to the radio access network node with respect to the at least one idle user equipment.

6. The method of claim 4, wherein the determined radio function parameter value comprises a best serving beam indication corresponding to a beam associated with the radio access network node having a higher signal strength than other signal strengths associated with other beams, other than the beam, corresponding to the radio access network node.

7. The method of claim 2, wherein the learning model training configuration comprises a training resource indication that is indicative to the at least one idle user equipment of a training resource usable to perform, by the idle user equipment, the training action.

8. The method of claim 7, wherein the radio access network node is a first radio access network node, the method further comprising:

receiving, by the first radio access network node from a second radio access network node that is a neighboring radio access network node with respect to the first radio access network node, a non-training resource indication that is indicative to the first radio access network node of a non-training resource to be reserved by the second radio access network node and usable by the second radio access network node to conduct non-training operations; and scheduling, by the first radio access network node, the training resource to avoid overlap of the training resource corresponding to the first radio access network node with the non-training resource corresponding to the second radio access network node.

9. The method of claim 1, wherein the radio access network node is a first radio access network node, wherein the learning model training configuration comprises a training action indication indicative of a training action to be performed by the at least one idle user equipment with respect to the first radio access network node to result in a first determined learning model parameter value, the method further comprising:

receiving, by the first radio access network node from the at least one idle user equipment, the first determined learning model parameter value;

receiving, by the first radio access network node from a second radio access network node that is a neighboring radio access network node with respect to the first radio access network node, a second determined learning model parameter value, wherein the training action was performed by at least one of the at least one idle user equipment with respect to the second radio access network node to result in the second determined learning model parameter value;

determining, by the first radio access network node, a composite determined learning model parameter value based on the first determined learning model parameter value and based on the second determined learning model parameter value; and broadcasting, by the first radio access network node to the at least one idle user equipment via a composite result information block message, the composite determined learning model parameter value.

10. The method of claim 9, wherein the training action corresponds to a radio function learning model, and wherein the composite determined learning model parameter value is usable by the at least one idle user equipment to train the radio function learning model to result in a trained learning model at the at least one idle user equipment.

11. The method of claim 10, further comprising:

receiving, by the first radio access network node from the at least one idle user equipment, a connection request message, comprising a performance indicator estimated by the at the at least one idle user equipment using the trained learning model to result in an estimated performance indicator; and based on the estimated performance indicator, establishing a connection with the at least one idle user equipment, as a result of which the at least one idle user equipment becomes at least one connected user equipment with respect to the first radio access network node.

12. The method of claim 1, wherein the learning model configuration information block message is a system information block message.

13. The method of claim 1, wherein the learning model configuration information block message is a master information block message.

14. A first radio access network node, comprising:

at least one processor configured to:

receive, from a second radio access network node that is a neighboring radio access network node with respect to the first radio access network node, a non-training resource indication that is indicative to the first radio access network node of a non-training resource to be used by the second radio access network node to conduct a non-training operation;

schedule a training resource, to be used by at least one idle mode user equipment to perform a training action with respect to the first radio access network node, wherein the training resource and the non-training resource are non-overlapping;

broadcast a master information block message comprising a training configuration resource indication that is indicative of a training configuration resource to be used to broadcast a learning model training configuration by the first radio access network node and to receive, by the at least one idle mode user equipment, the learning model training configuration; and broadcast the learning model training configuration according to the training configuration resource, wherein the training configuration resource comprises a time resource or a frequency resource.

15. The first radio access network node of claim 14, wherein the learning model training configuration comprises a training resource indication that is indicative to the at least one idle mode user equipment of the training resource to be used to perform the training action by the at least one idle mode user equipment.

16. The first radio access network node of claim 14, wherein the master information block message further comprises a training result resource indication that is indicative of a training result resource to be used by the at least one idle mode user equipment to receive, from the first radio access network node, a training result that results from performing, by the at least one idle mode user equipment, the training action.

17. The first radio access network node of claim 14, wherein the at least one processor is further configured to:

determine a training result that results from performing, by the at least one idle mode user equipment, the training action; and based on the training result, establishing a connection with the at least one idle mode user equipment, as a result of which the at least one idle mode user equipment becomes an at least one connected mode user equipment.

18. A non-transitory machine-readable medium, comprising executable instructions that, when executed by at least one processor of a first radio access network node, facilitate performance of operations, comprising:

broadcasting a first information block message comprising a training configuration resource indication that is indicative of at least one training configuration resource that is to be usable by at least one idle user equipment operating in at least one idle mode to receive at least one learning model training configuration;

broadcasting the at least one learning model training configuration according to the at least one training configuration resource, wherein the at least one learning model training configuration comprises a training action indication indicative of a training action to be performed by a first of at least one idle user equipment with respect to the first radio access network node to result in a first determined learning model parameter value, and wherein the at least one training configuration resource comprises at least one time resource or at least one frequency resource;

receiving, from the first of the at least one idle user equipment, the first determined learning model parameter value;

receiving, from a second radio access network node that is a neighboring radio access network node with respect to the first radio access network node, a second determined learning model parameter value, wherein the training action was performed by at least a second of the at least one idle user equipment with respect to the second radio access network node to result in the second determined learning model parameter value;

determining, based on the first determined learning model parameter value and based on the second determined learning model parameter value, an updated learning model; and broadcasting, to be receivable by the first of the at least one idle user equipment via a second information block message, the updated learning model.

19. The non-transitory machine-readable medium of claim 18, wherein the training action was performed by the first of the at least one idle user equipment with respect to the second radio access network node to result in the second determined learning model parameter value.

20. The non-transitory machine-readable medium of claim 18, the operations further comprising:

transmitting, to the second radio access network node via a backhaul link, the updated learning model.

* * * * *